May 26, 1931.  W. W. CHRISTMAS  1,806,586
AEROPLANE
Filed Nov. 8, 1929  41 Sheets-Sheet 1
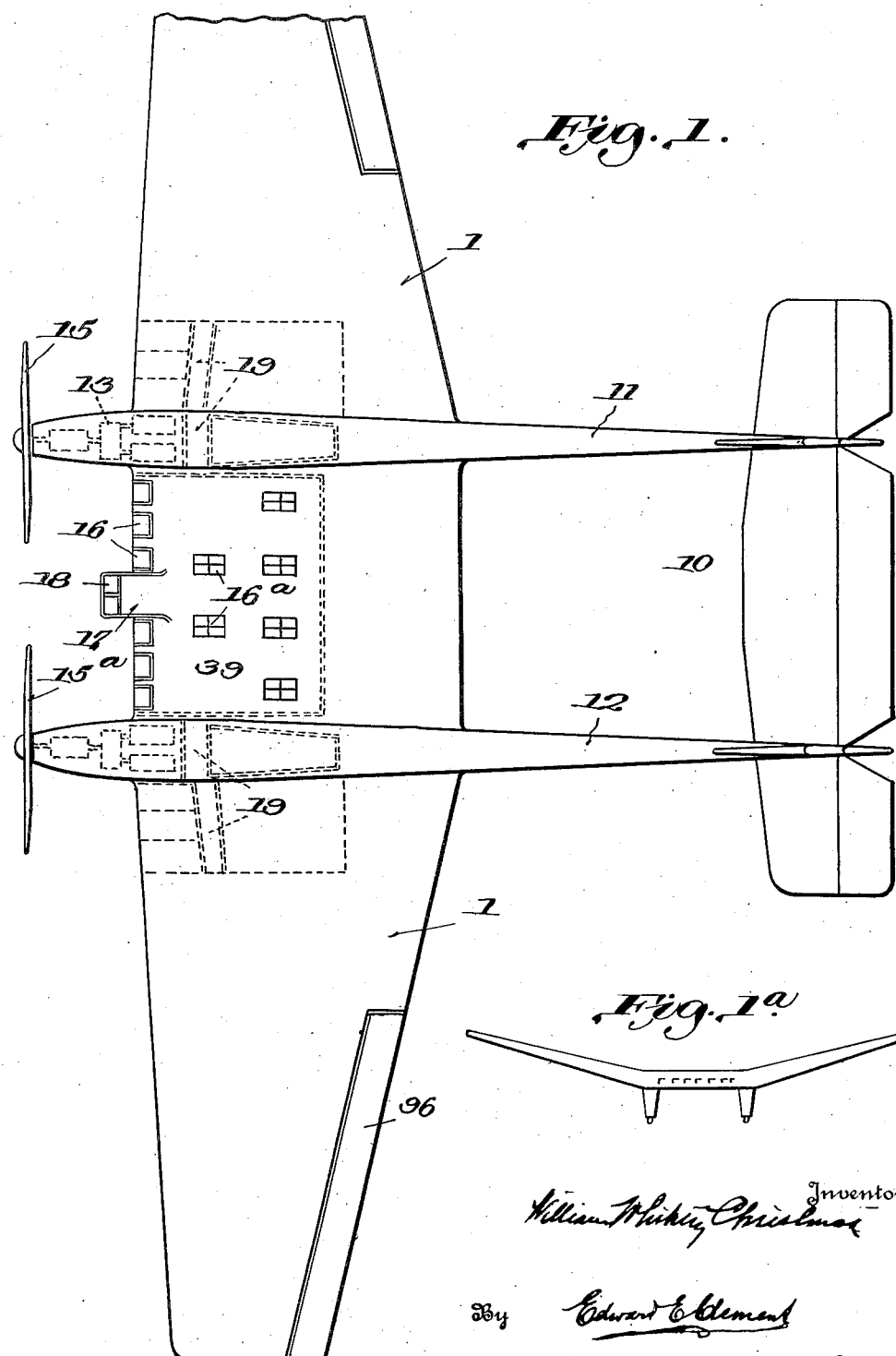

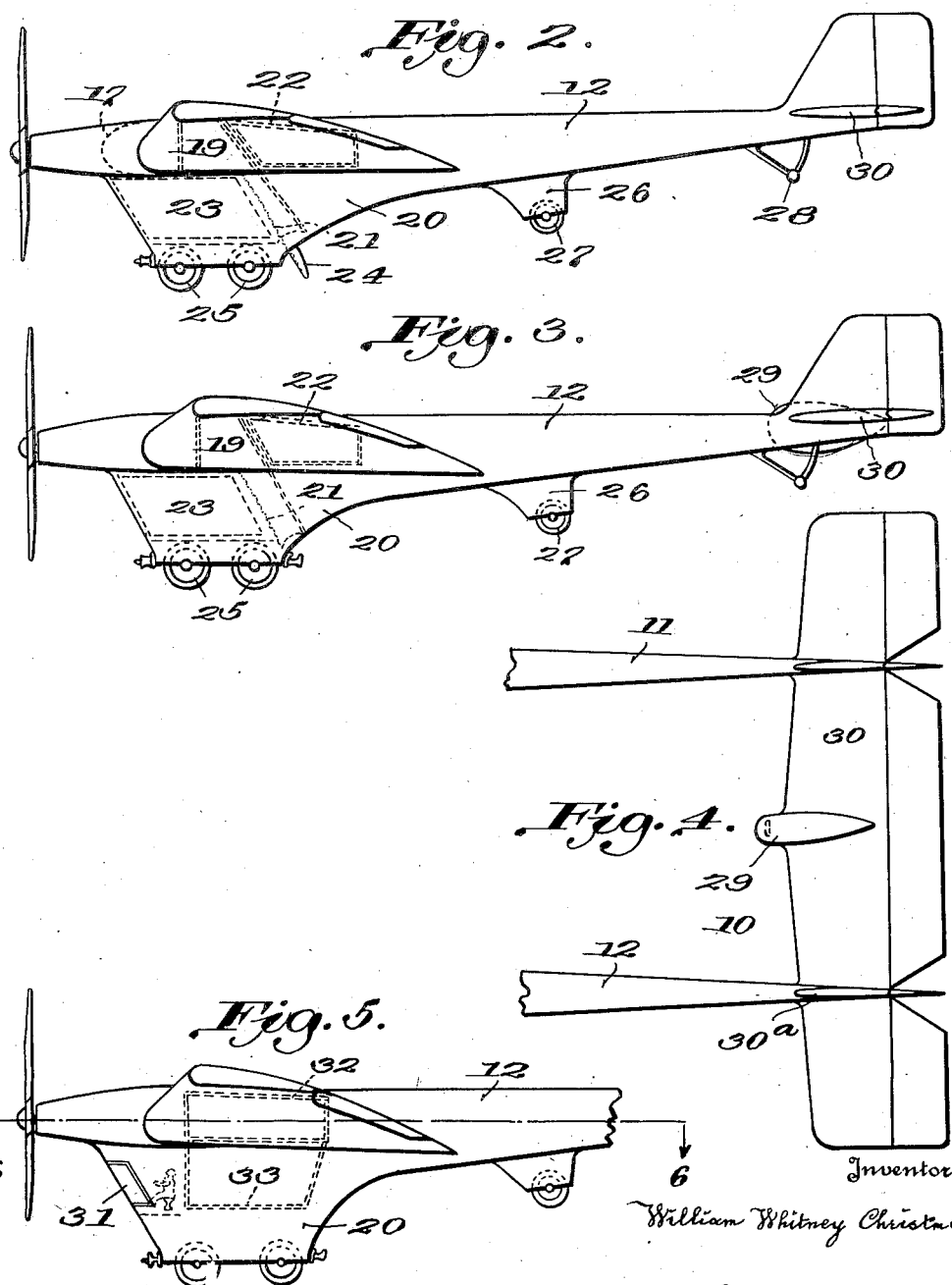

May 26, 1931. W. W. CHRISTMAS 1,806,586
AEROPLANE
Filed Nov. 8, 1929 41 Sheets-Sheet 3

Fig.6.

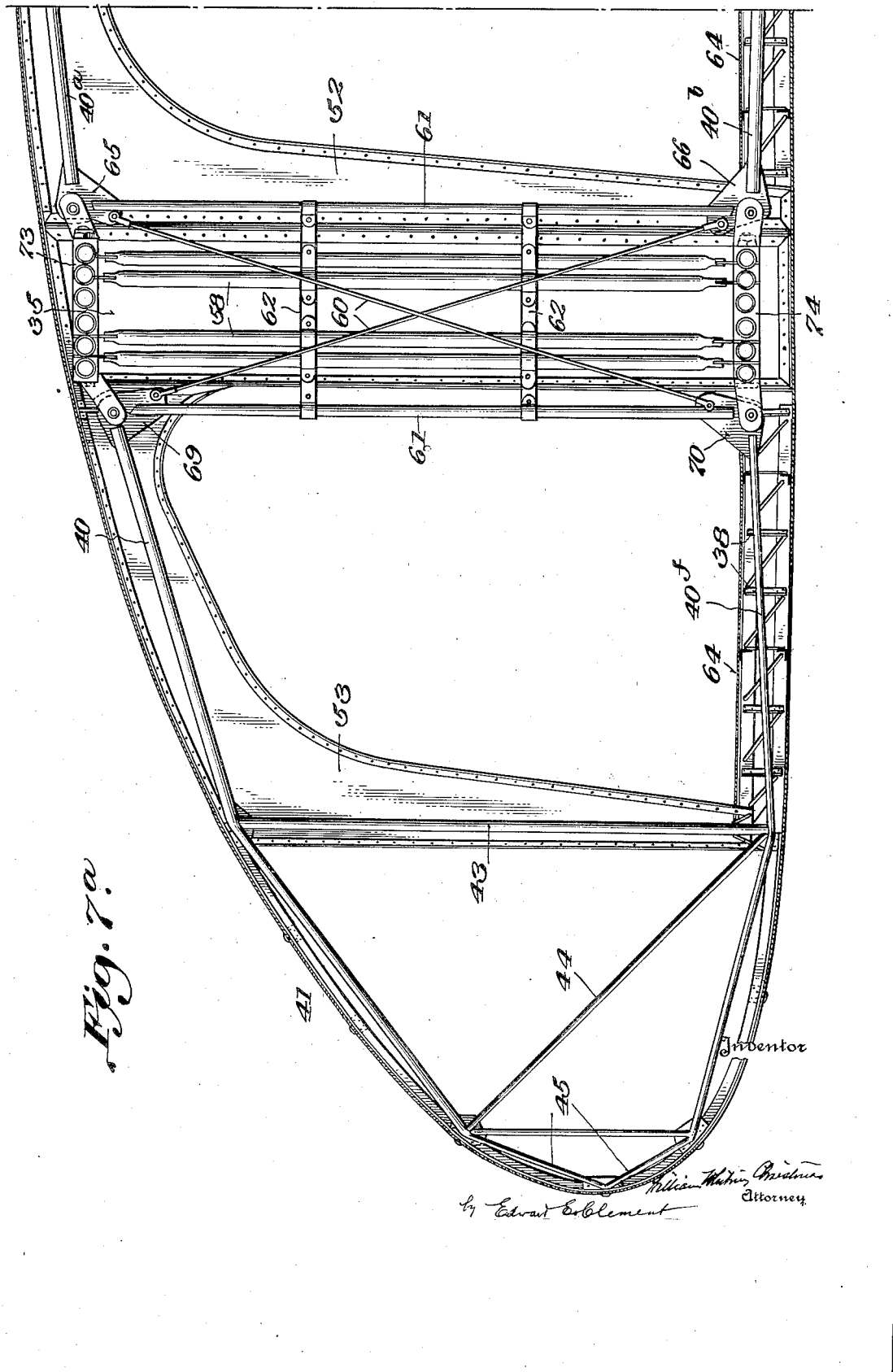

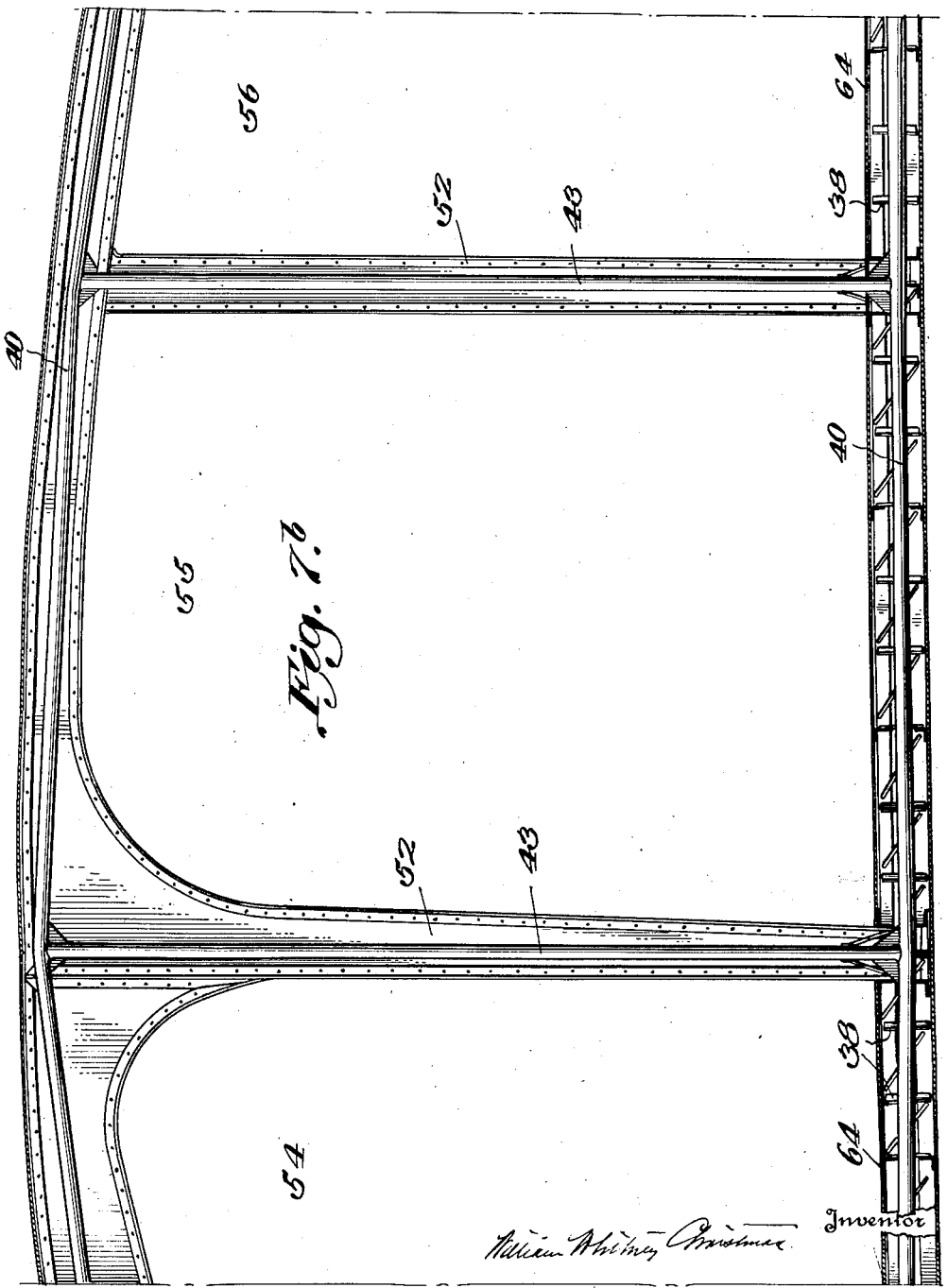

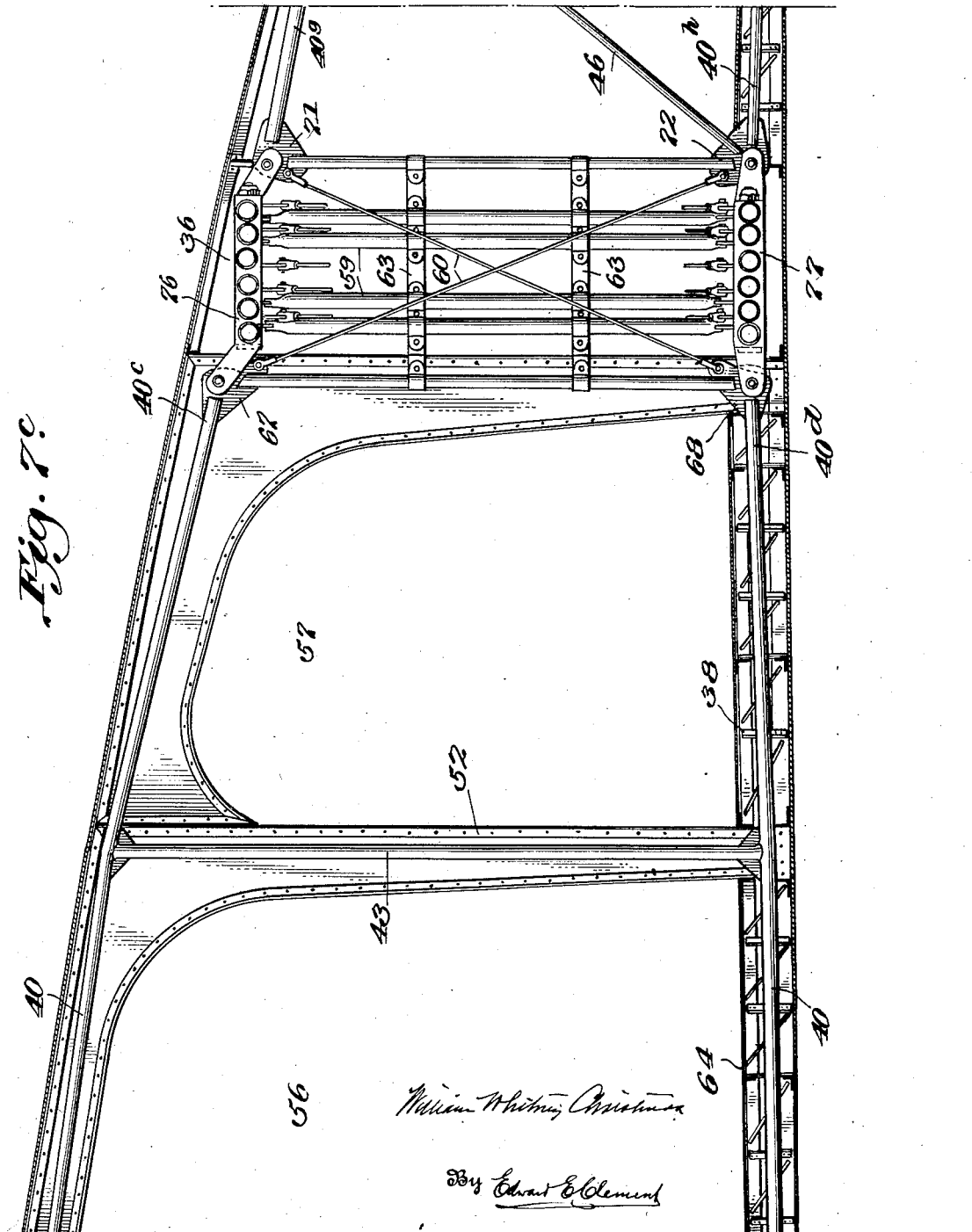

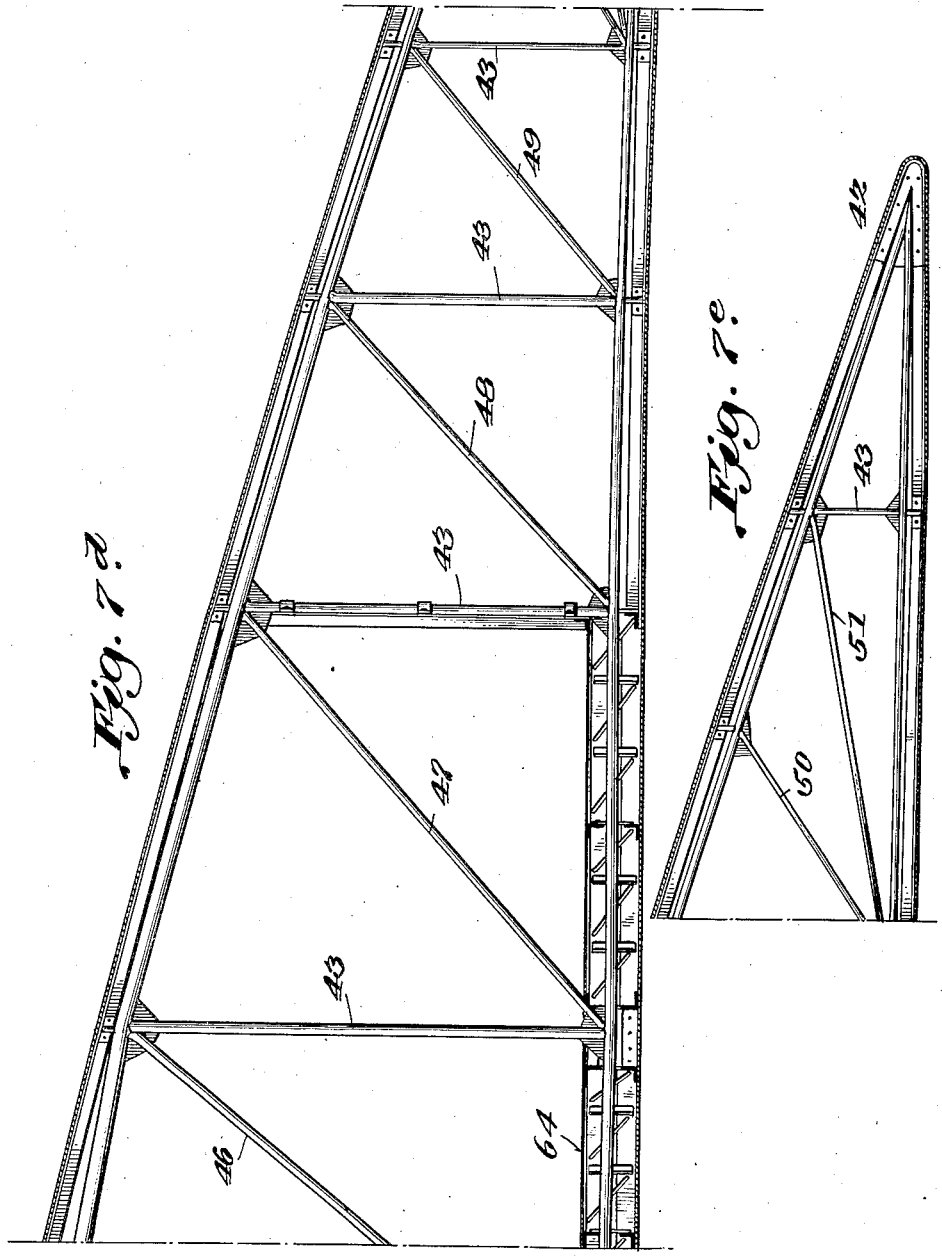

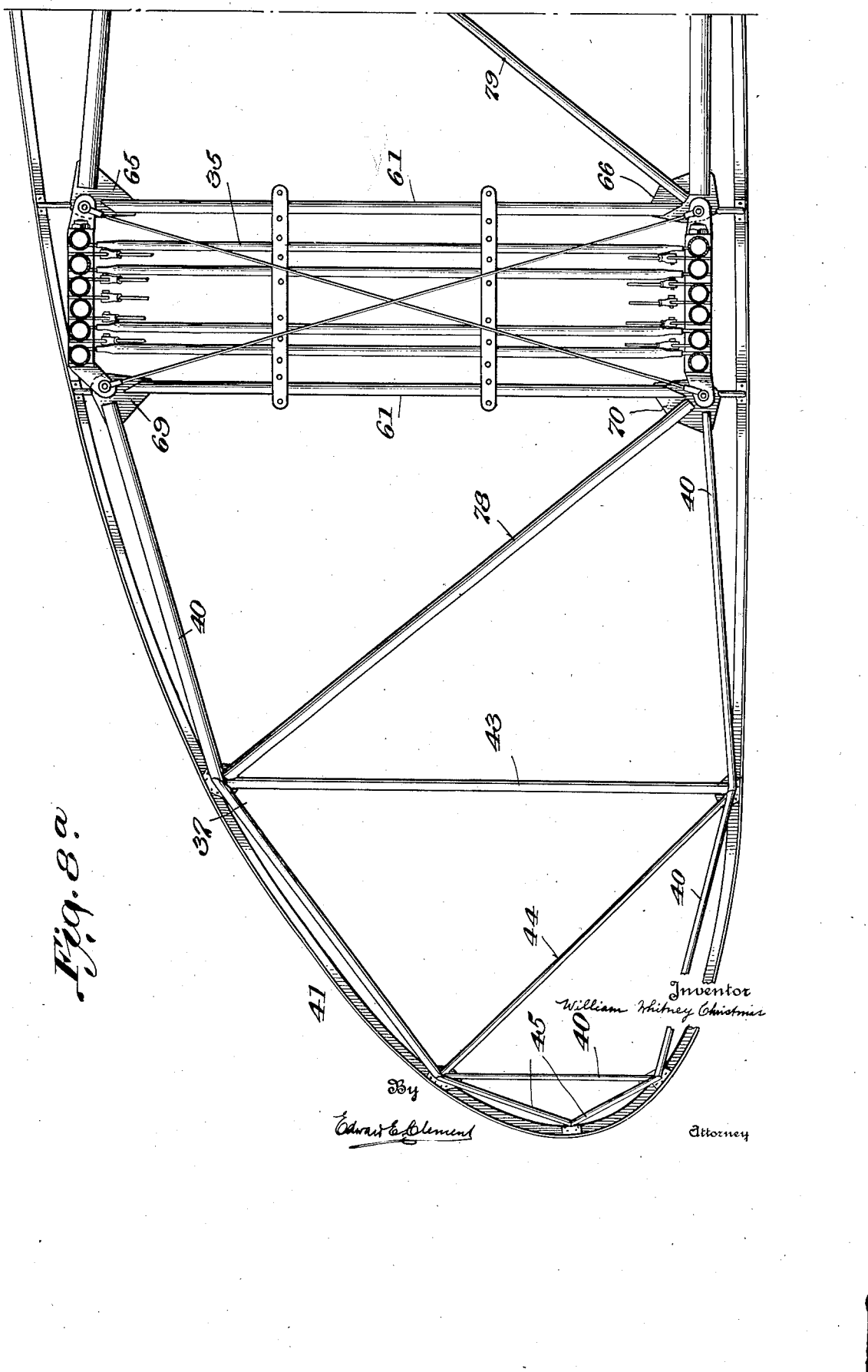

May 26, 1931. W. W. CHRISTMAS 1,806,586
AEROPLANE
Filed Nov. 8, 1929 41 Sheets-Sheet 9
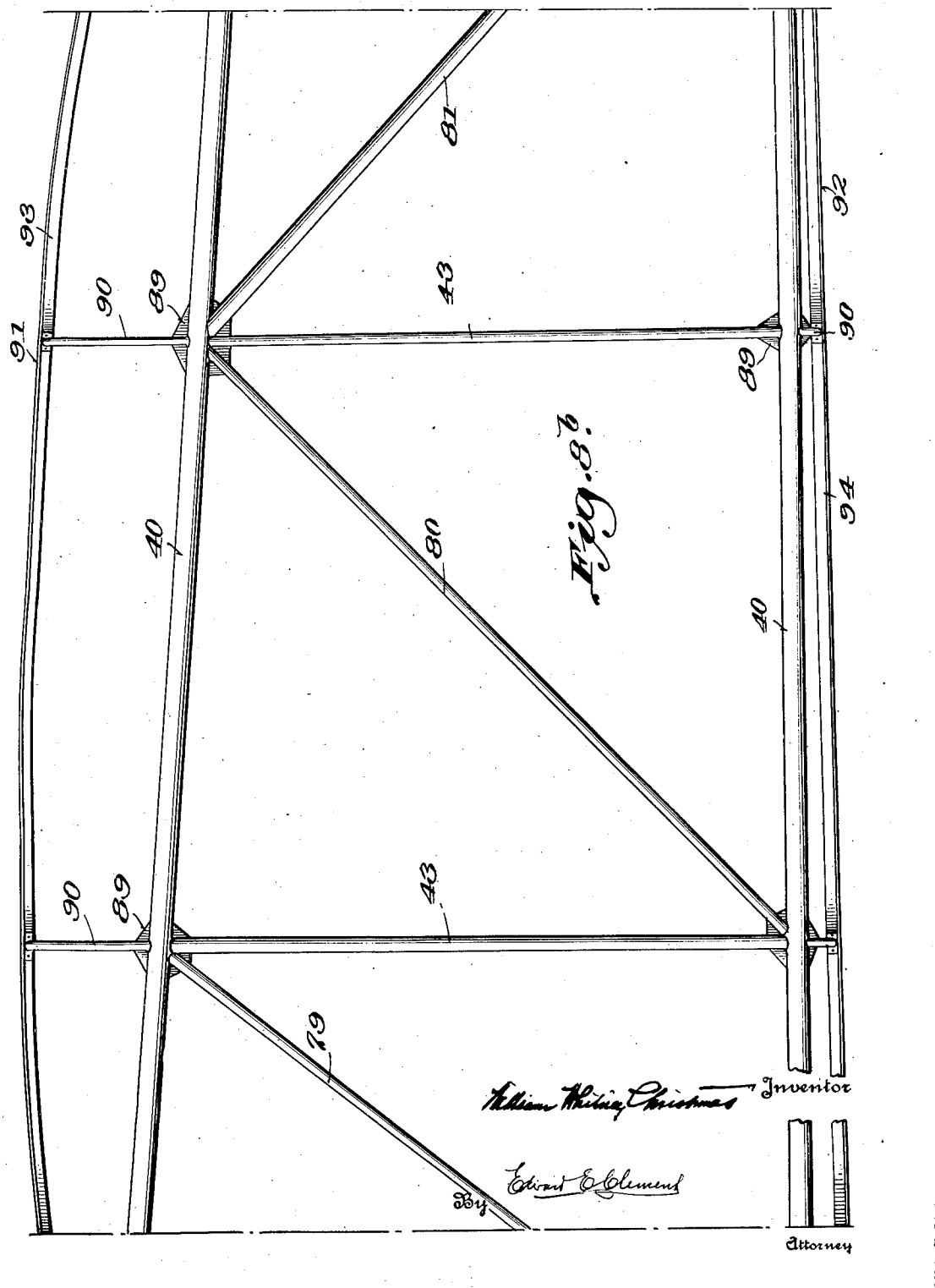

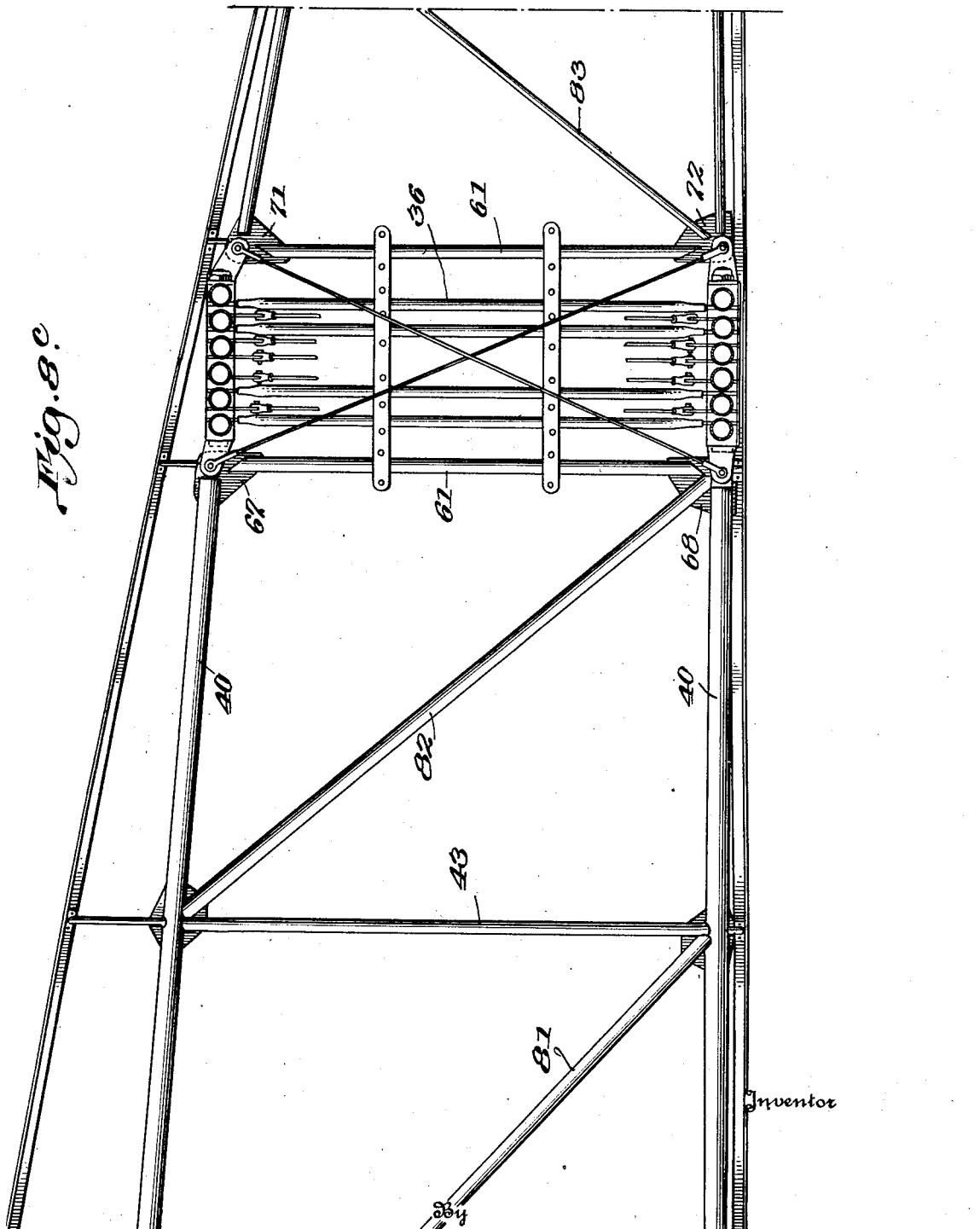

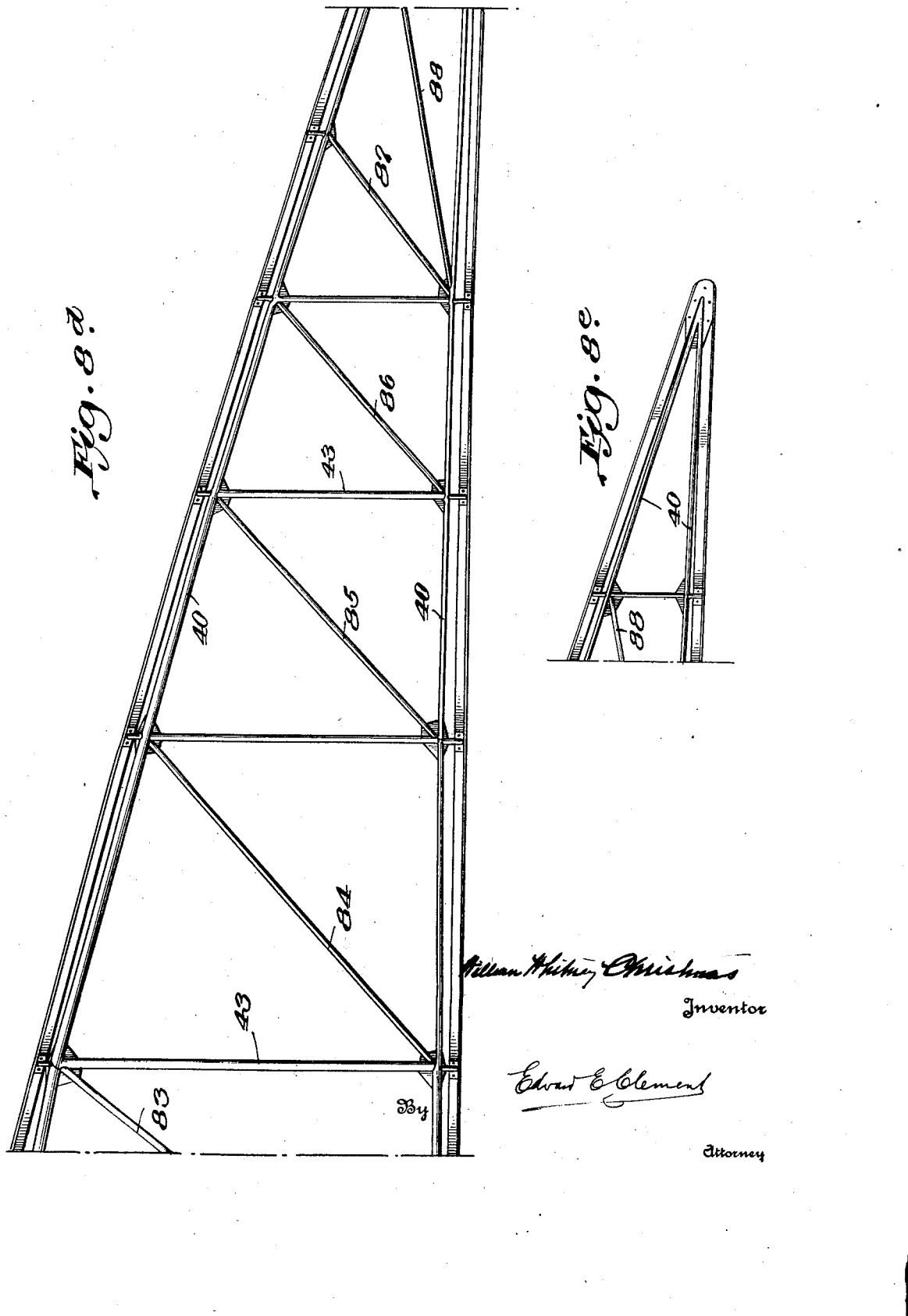

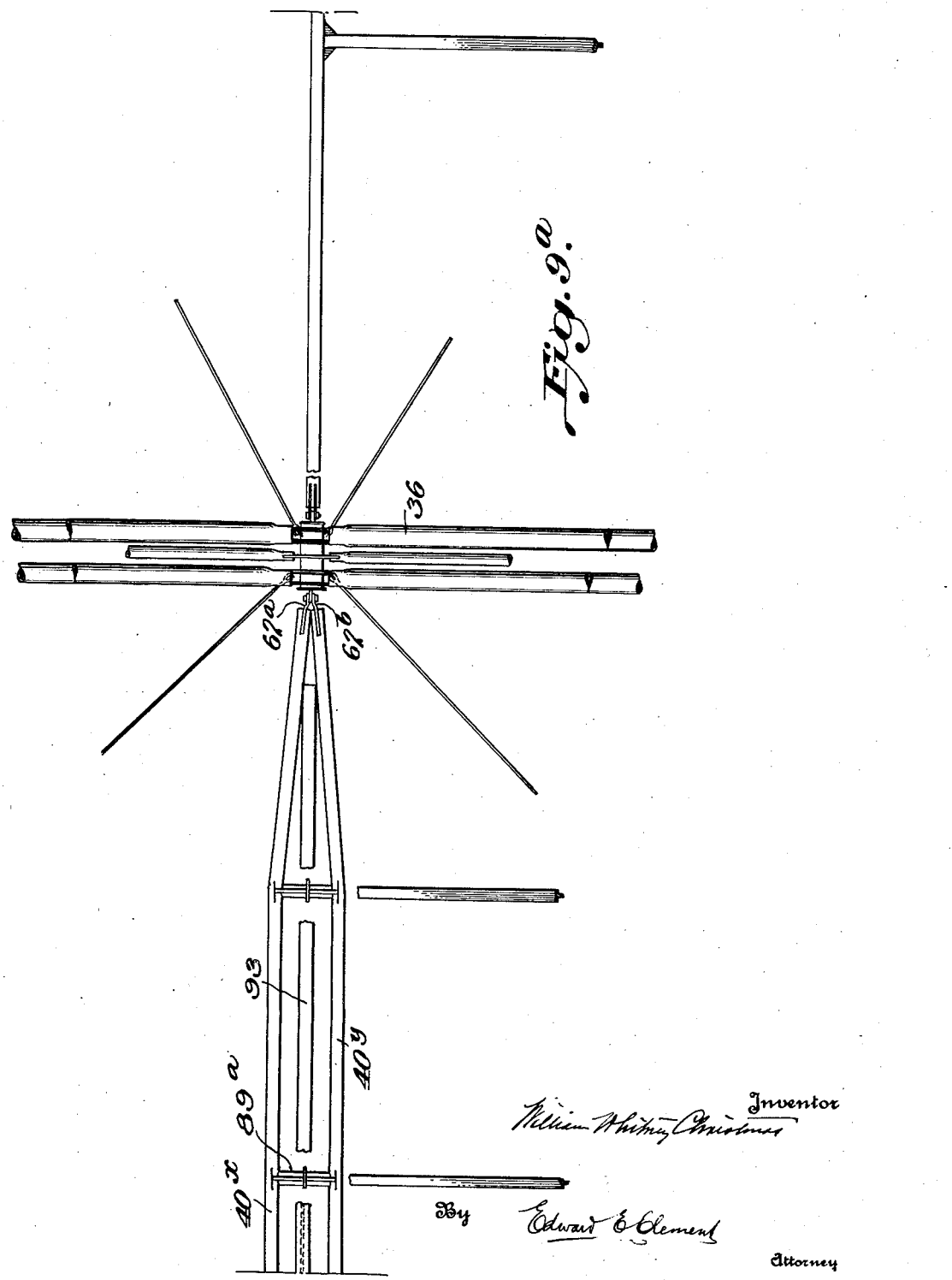

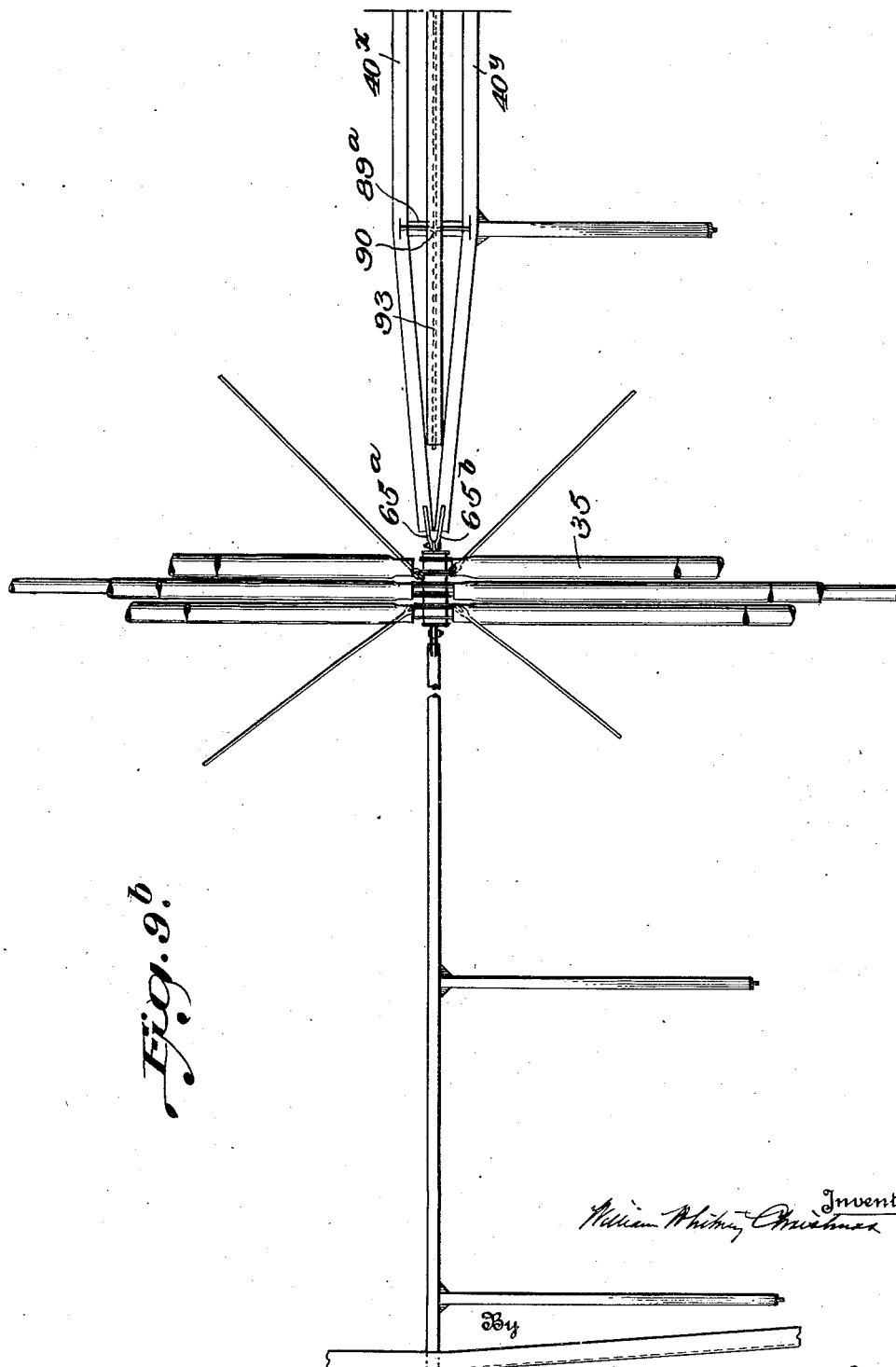

May 26, 1931. W. W. CHRISTMAS 1,806,586
AEROPLANE
Filed Nov. 8, 1929 41 Sheets-Sheet 14
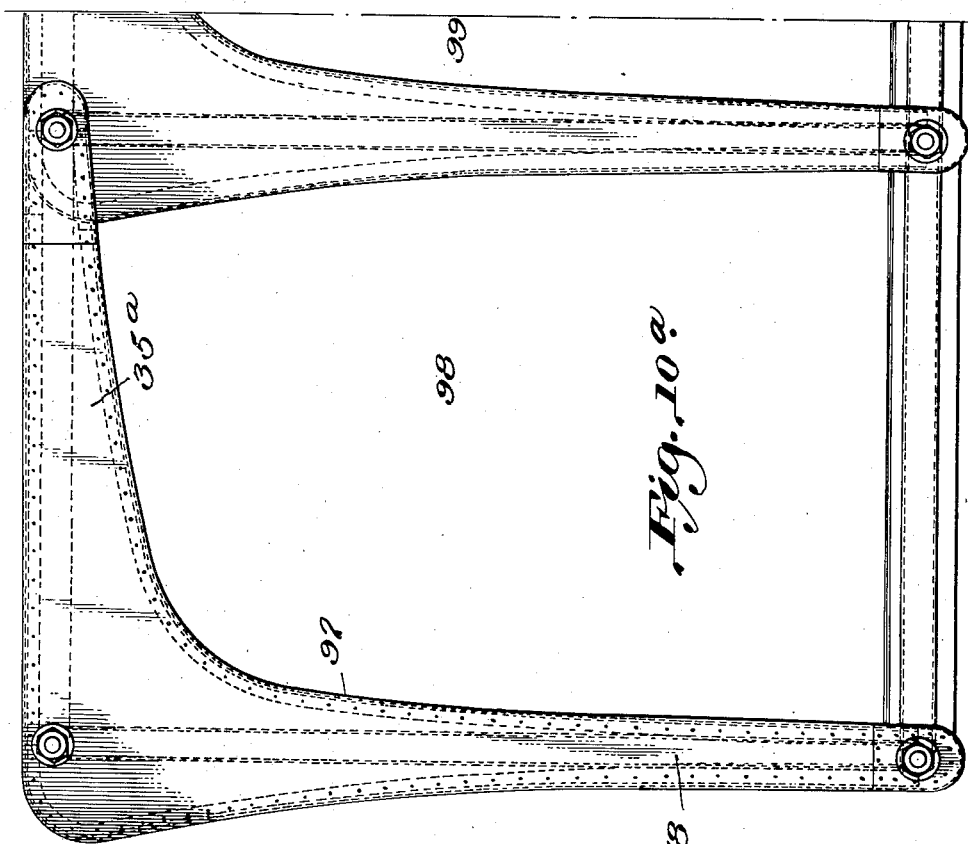
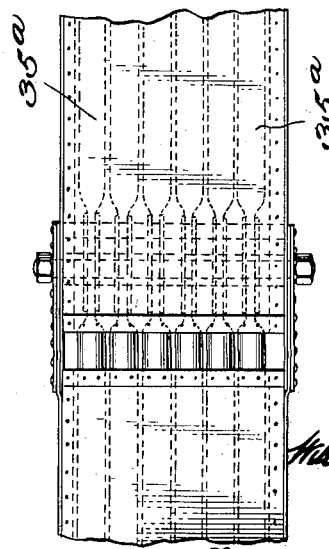

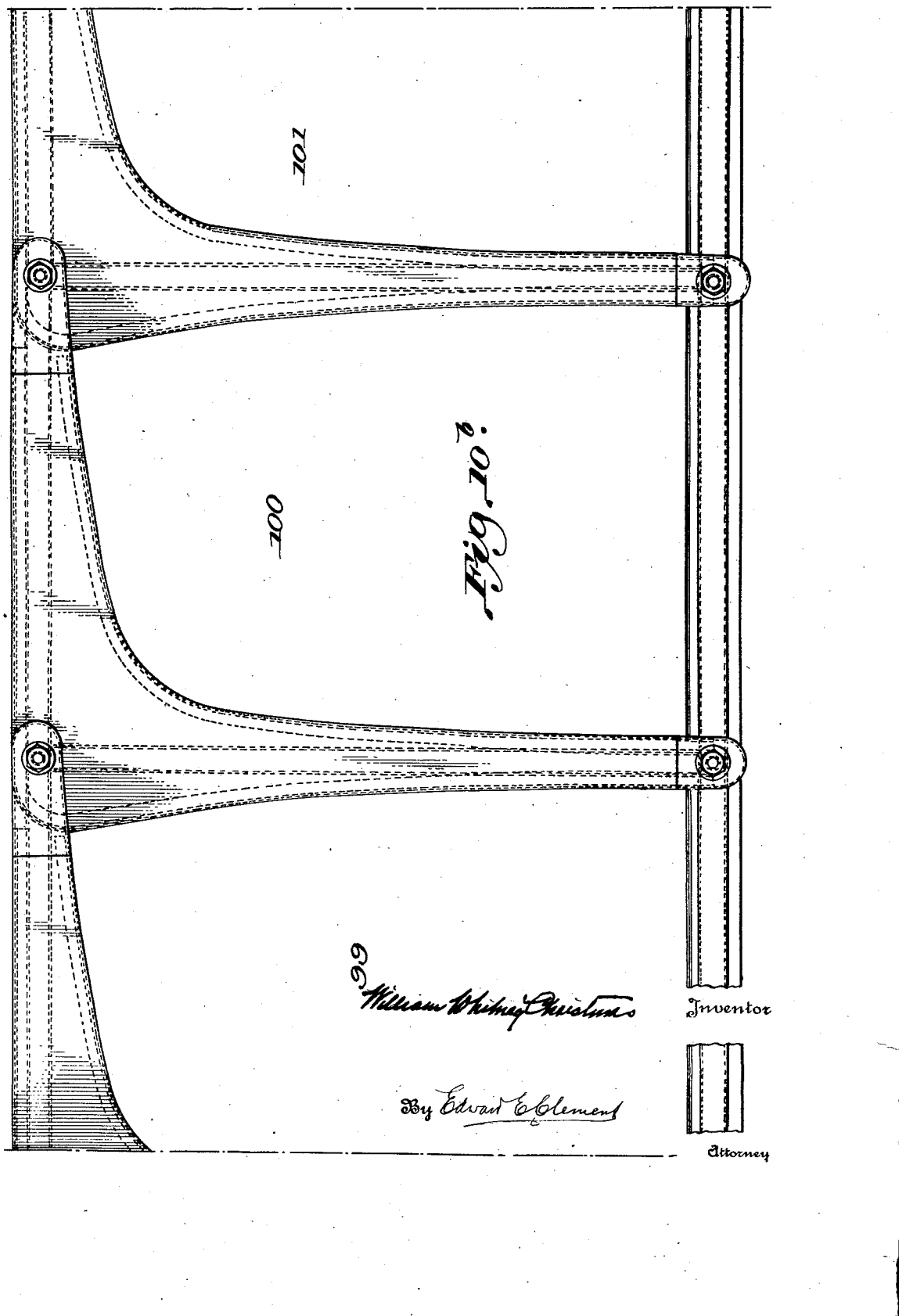

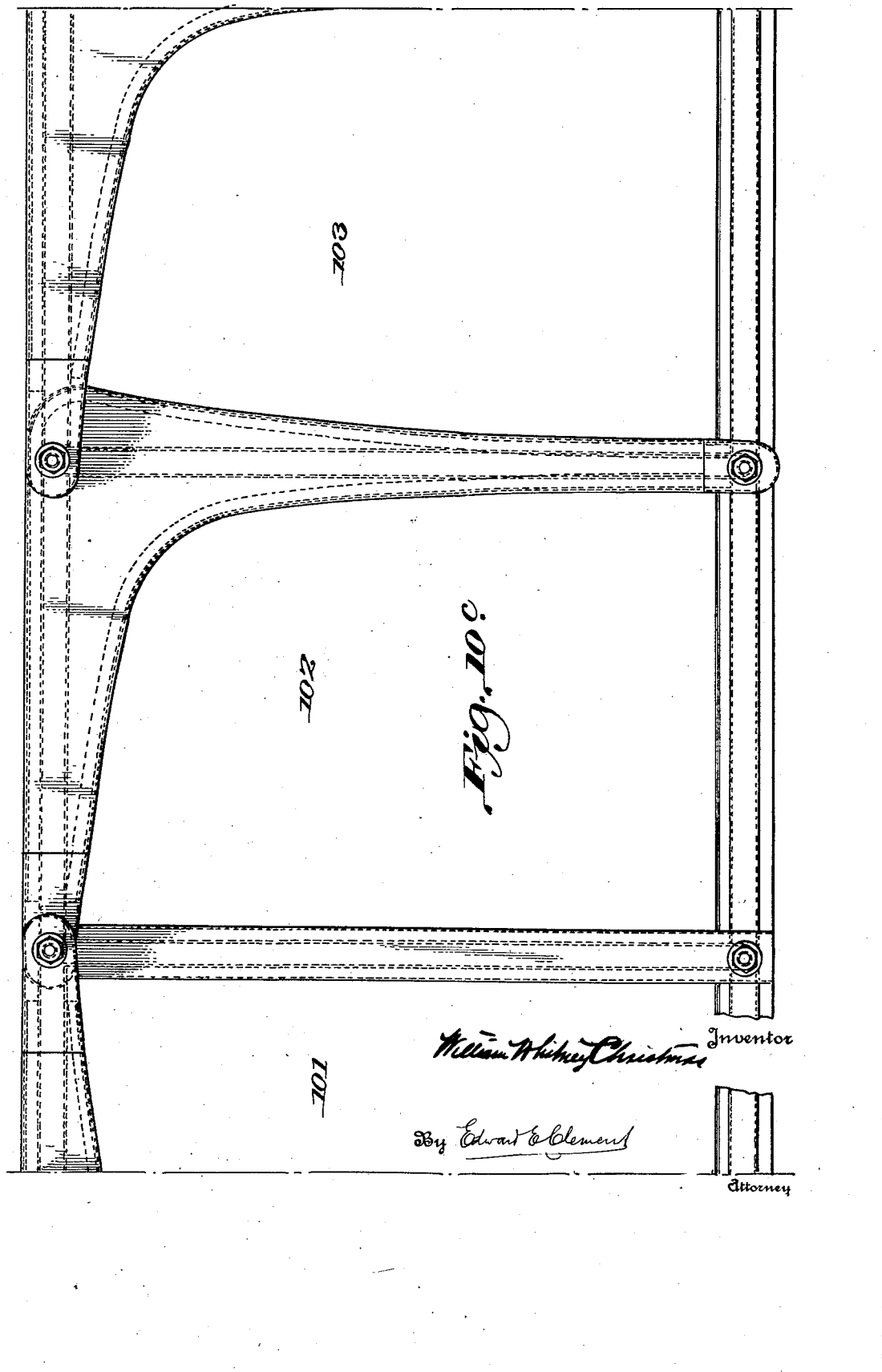

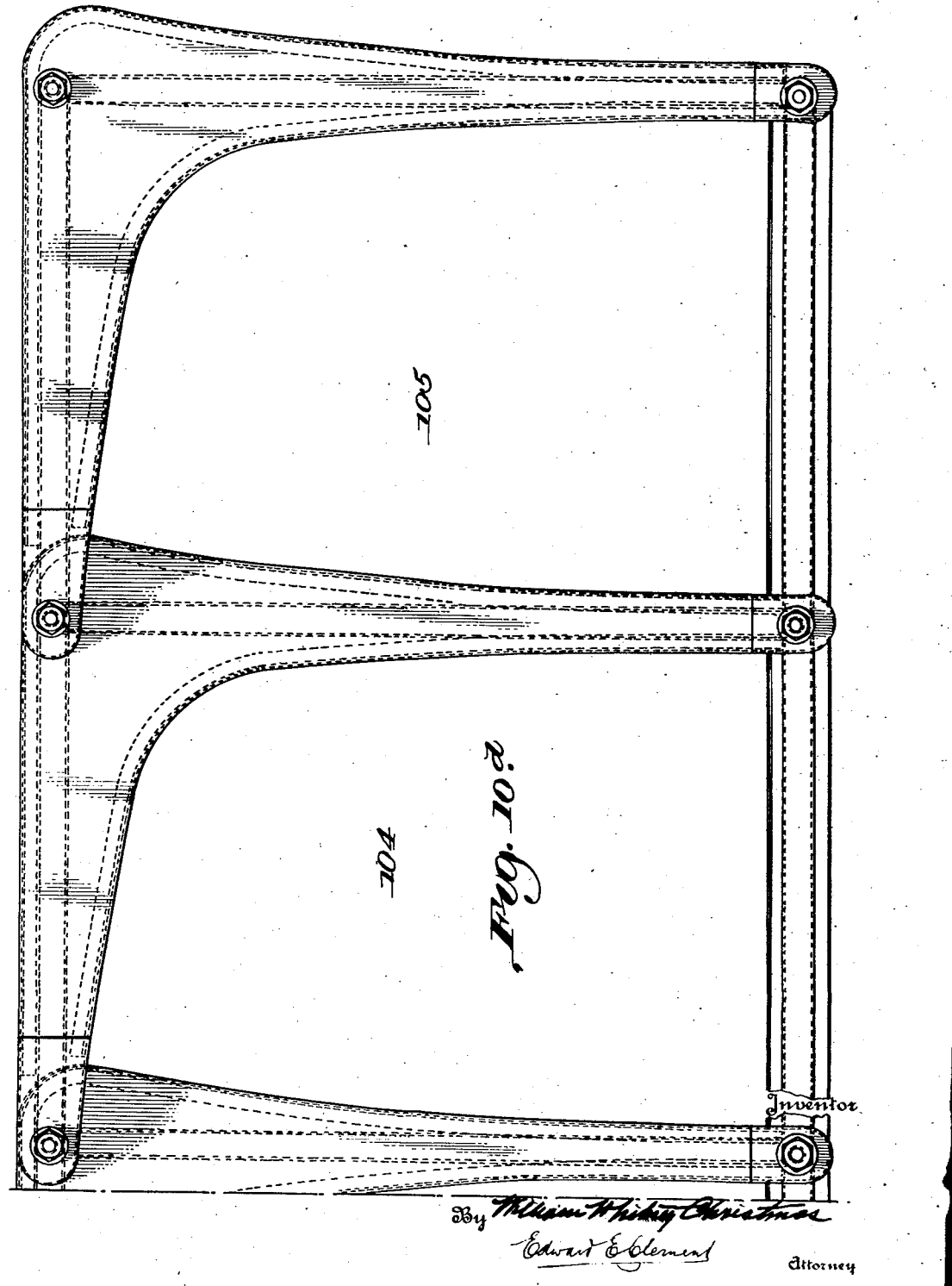

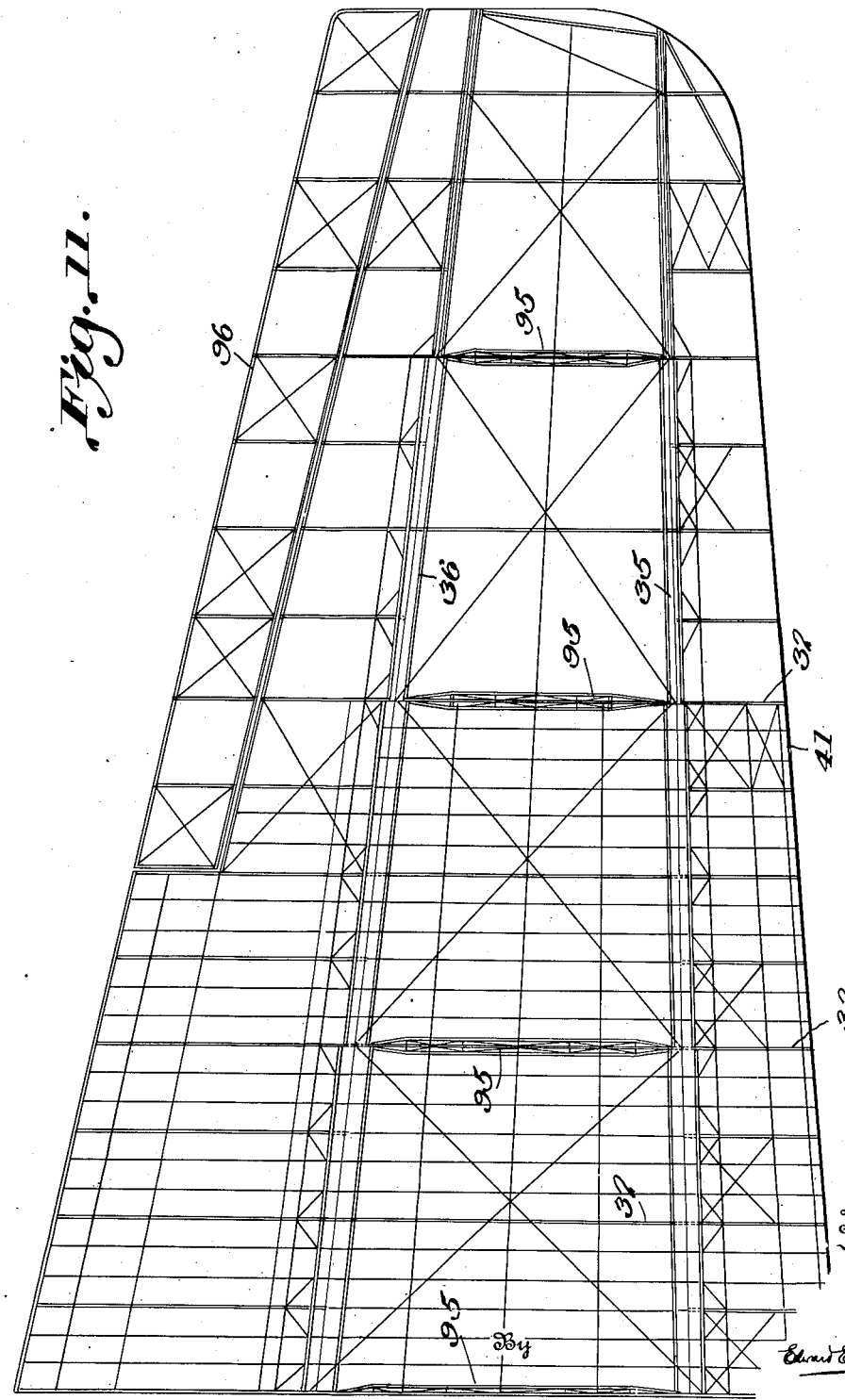

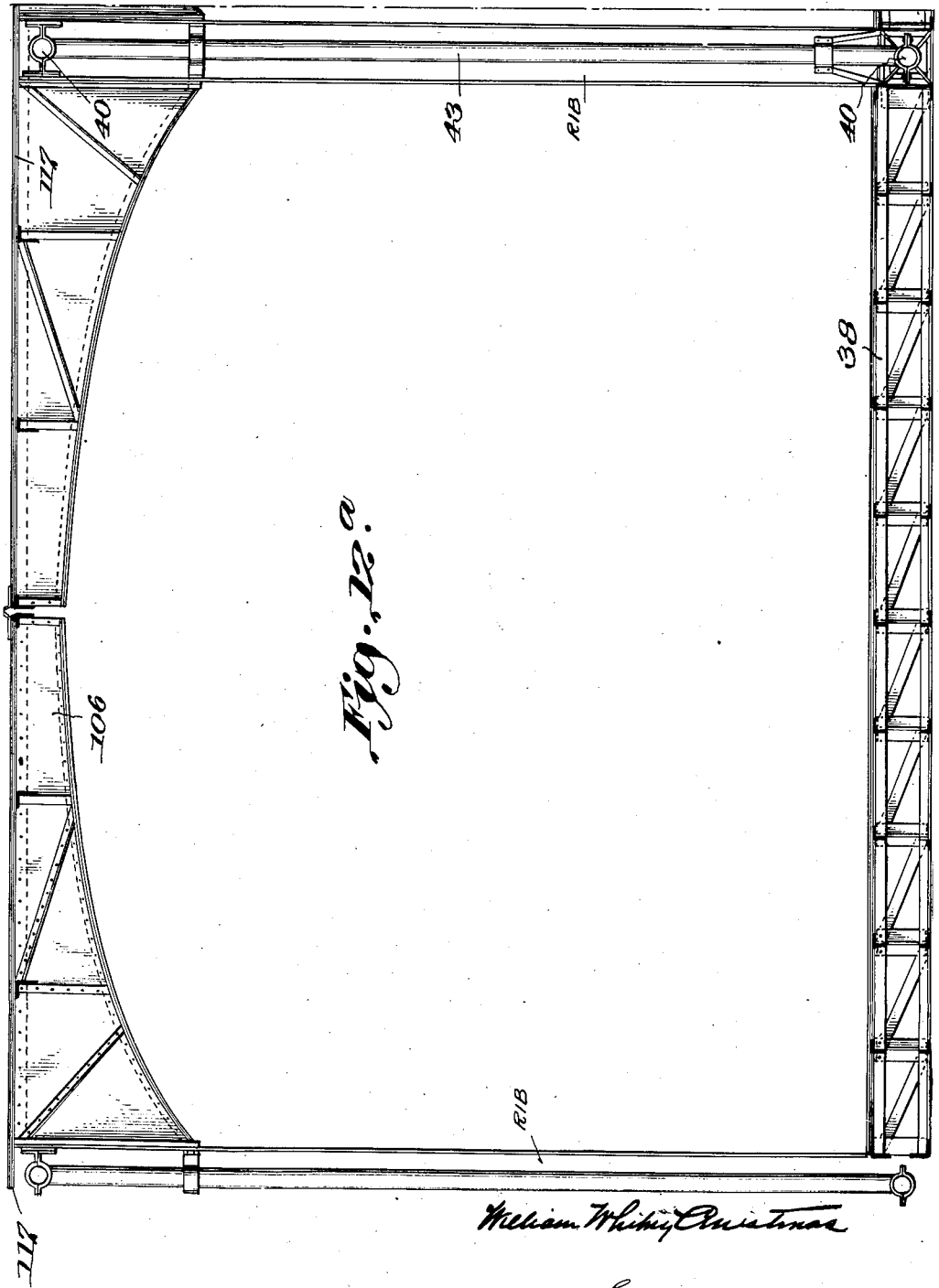

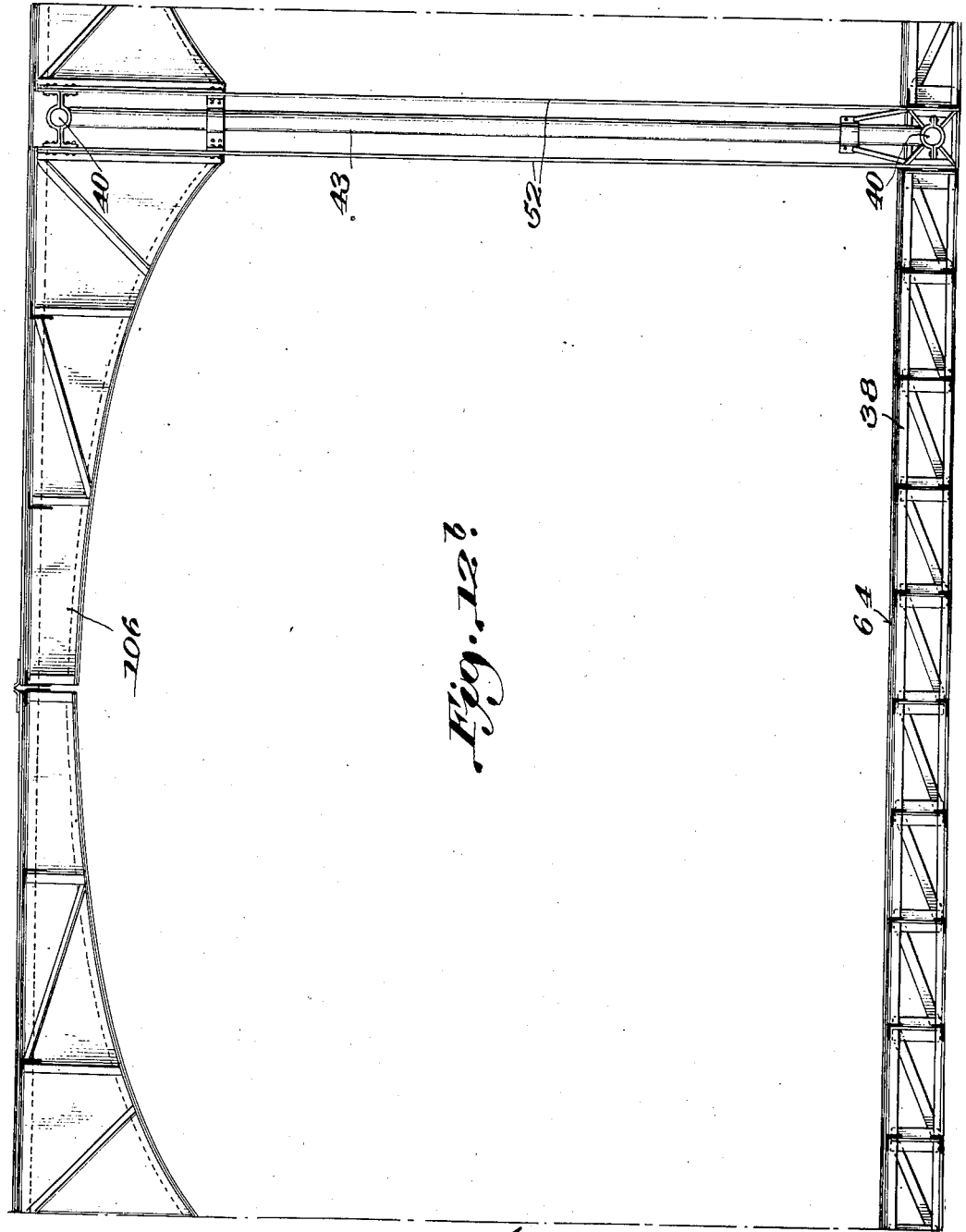

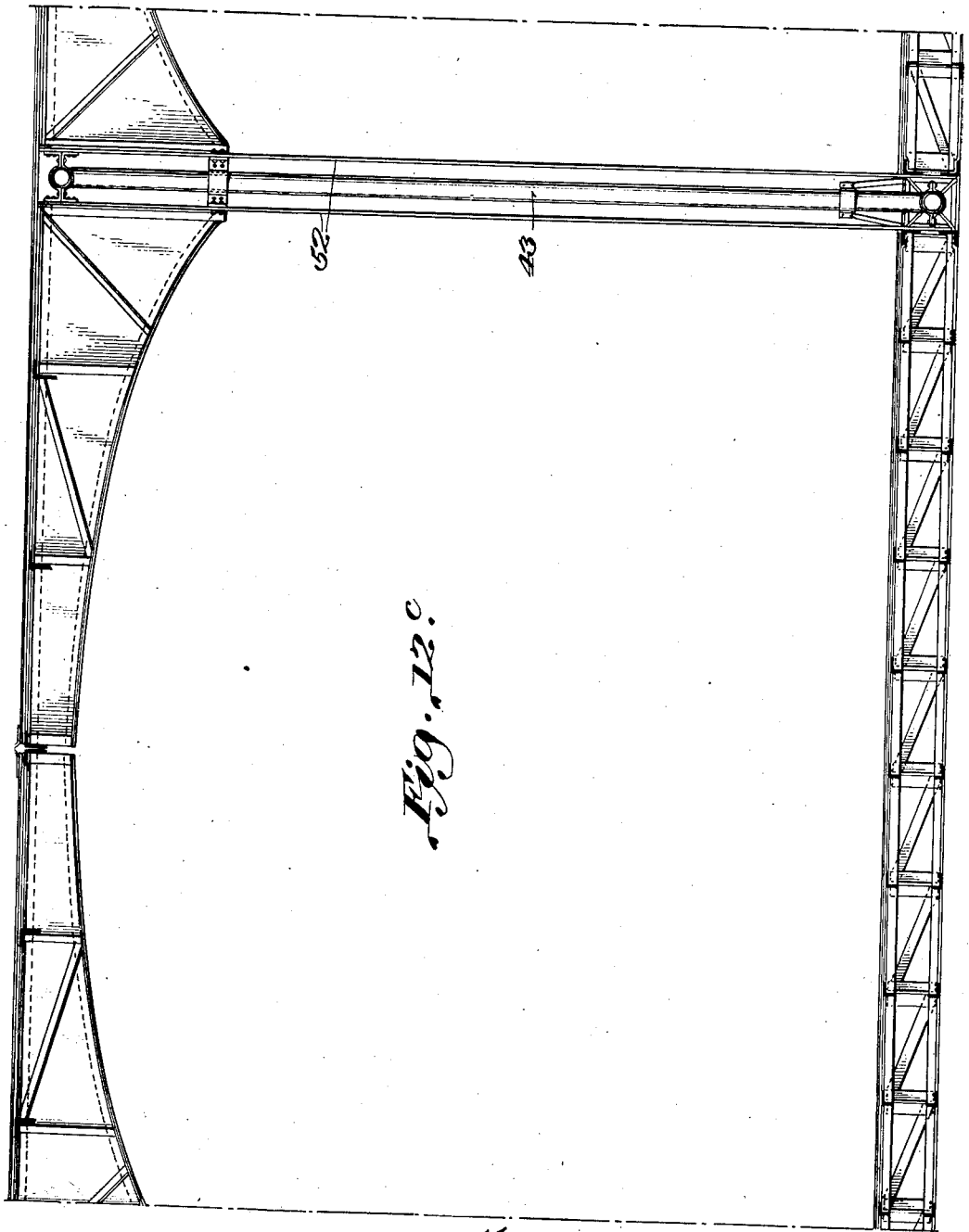

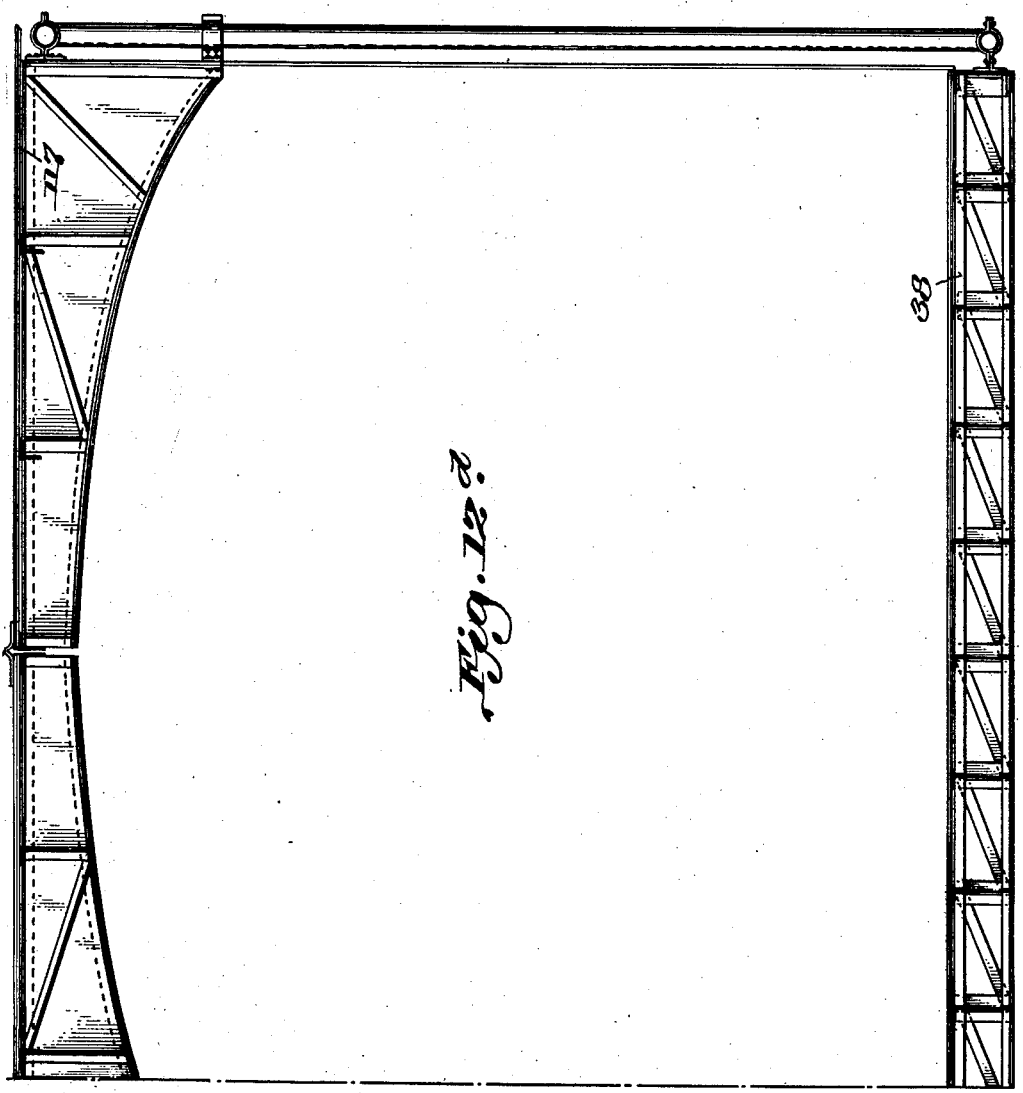

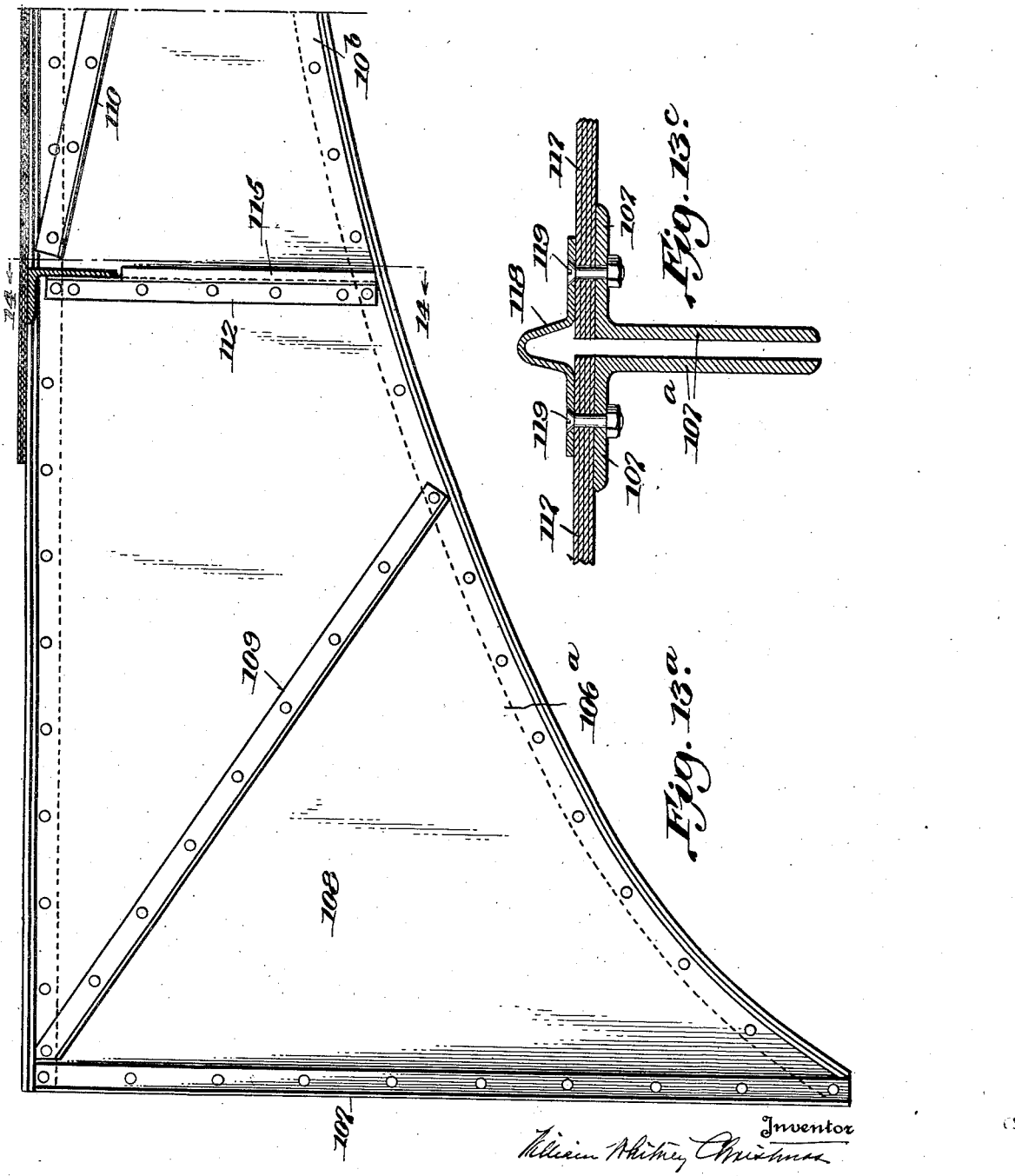

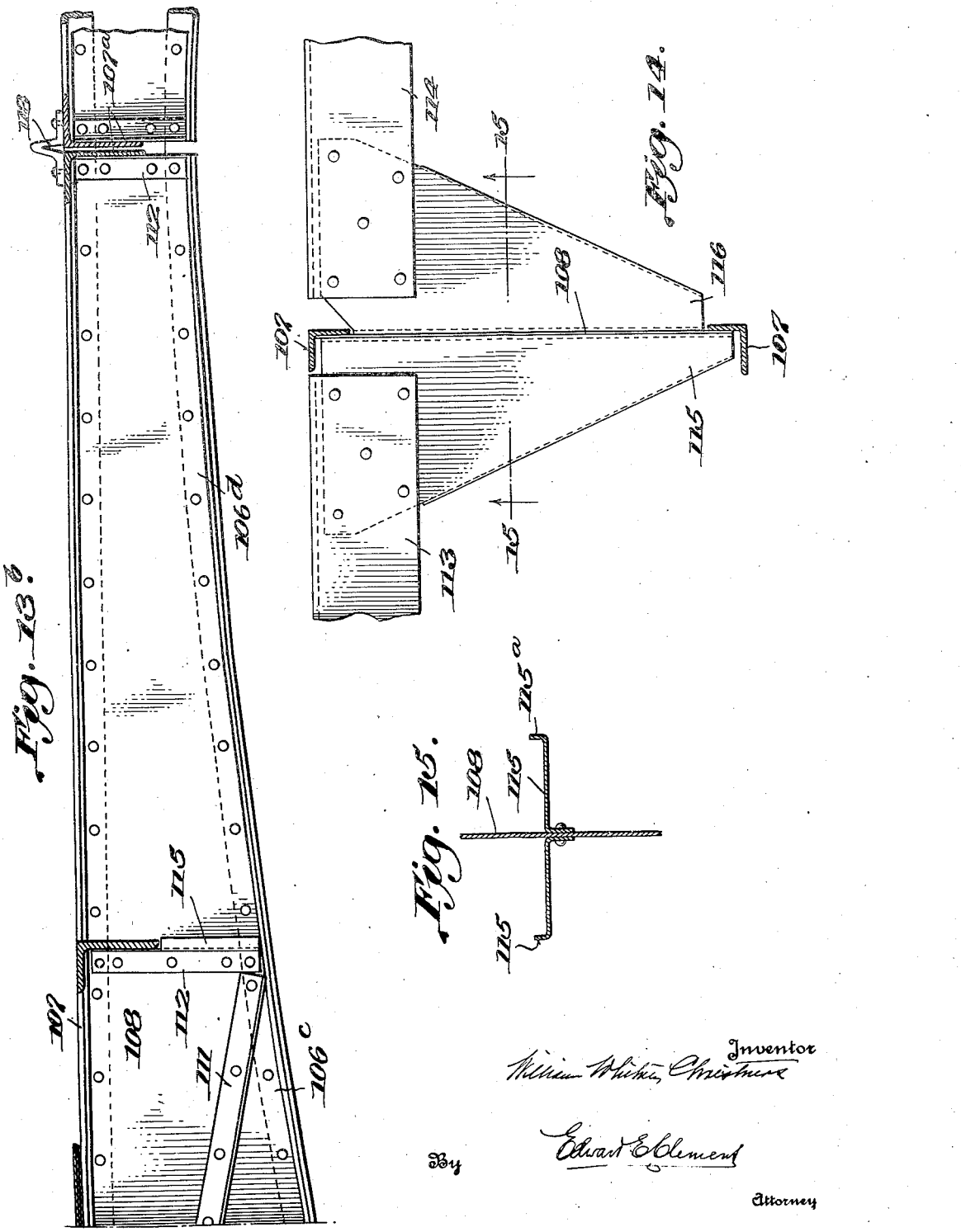

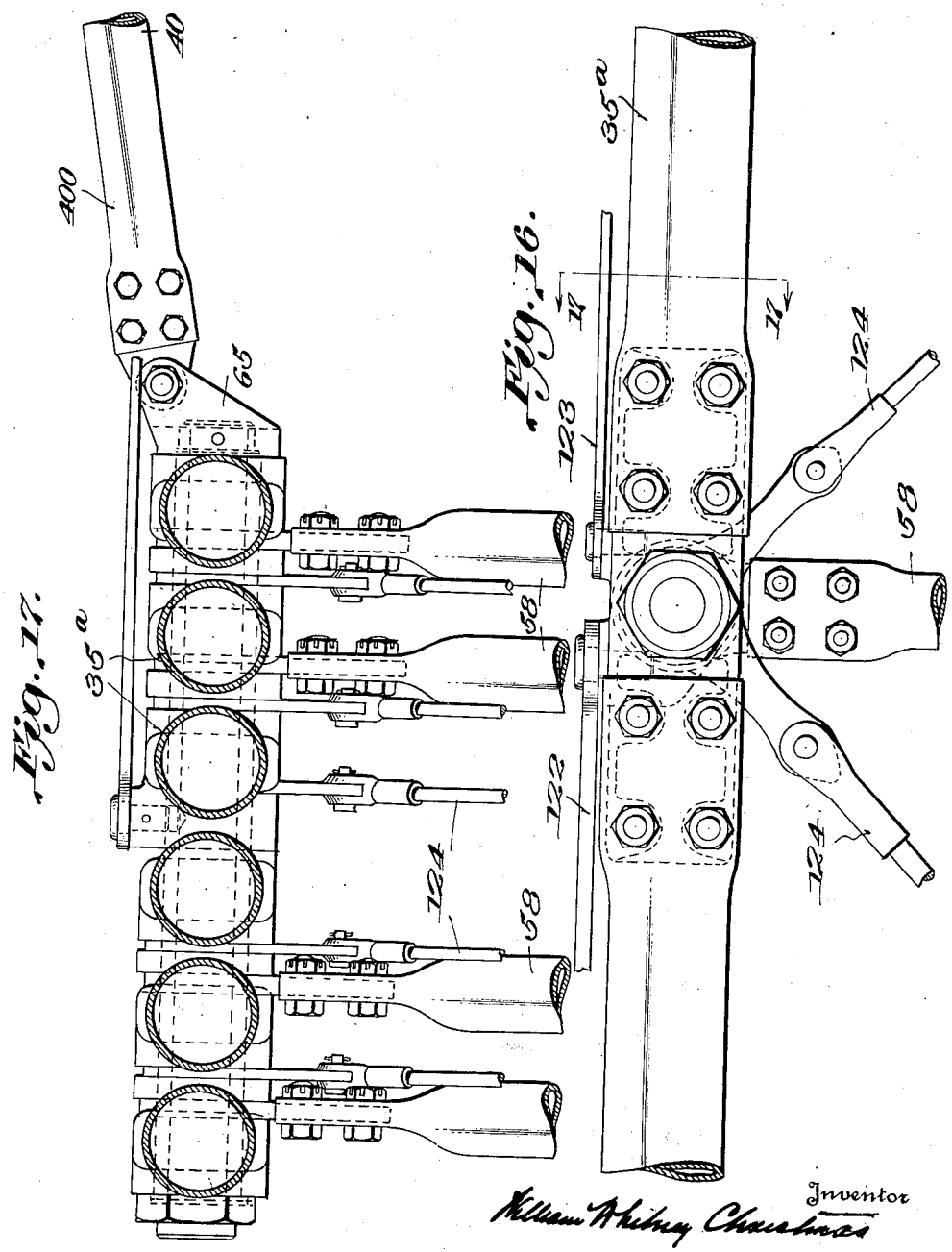

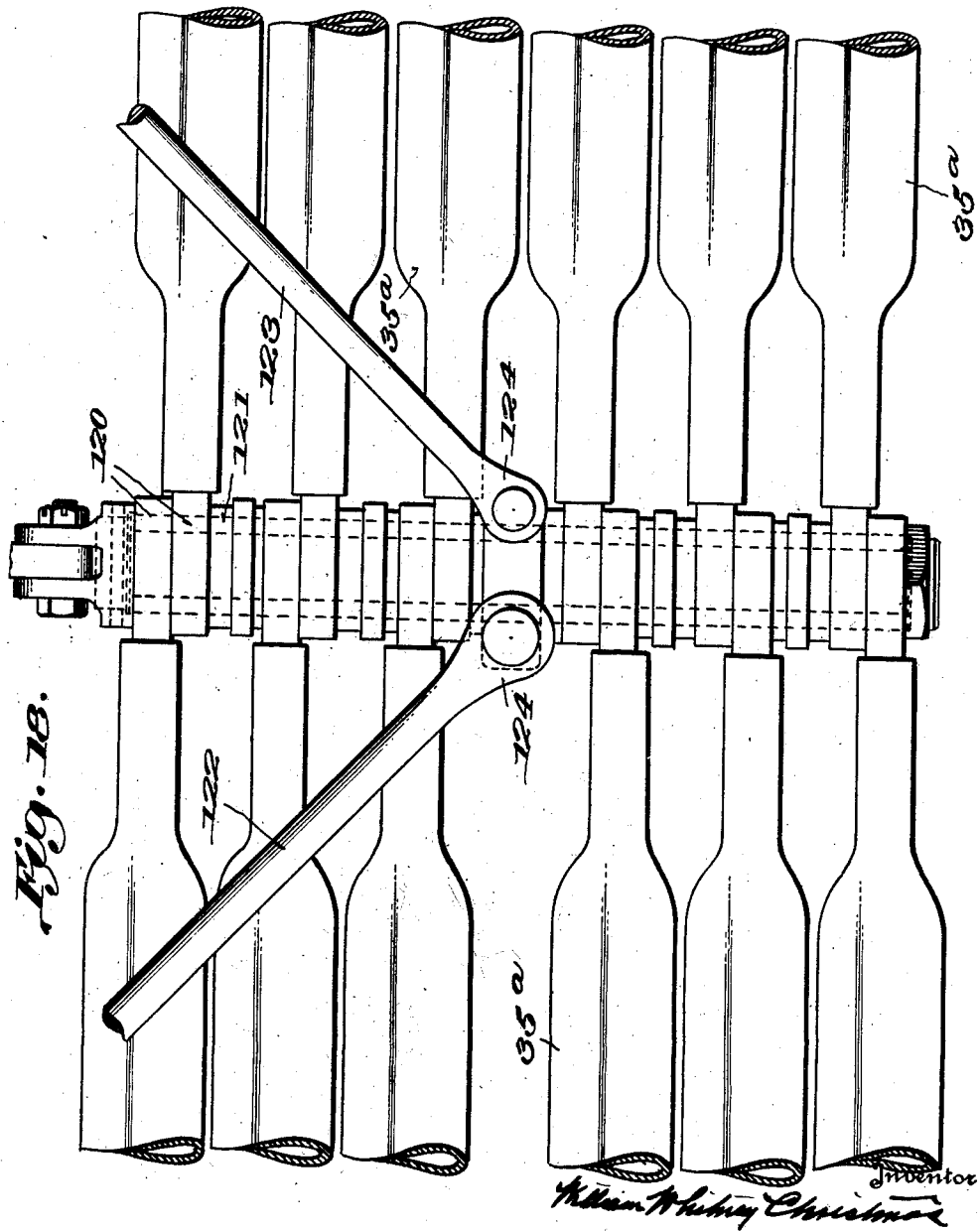

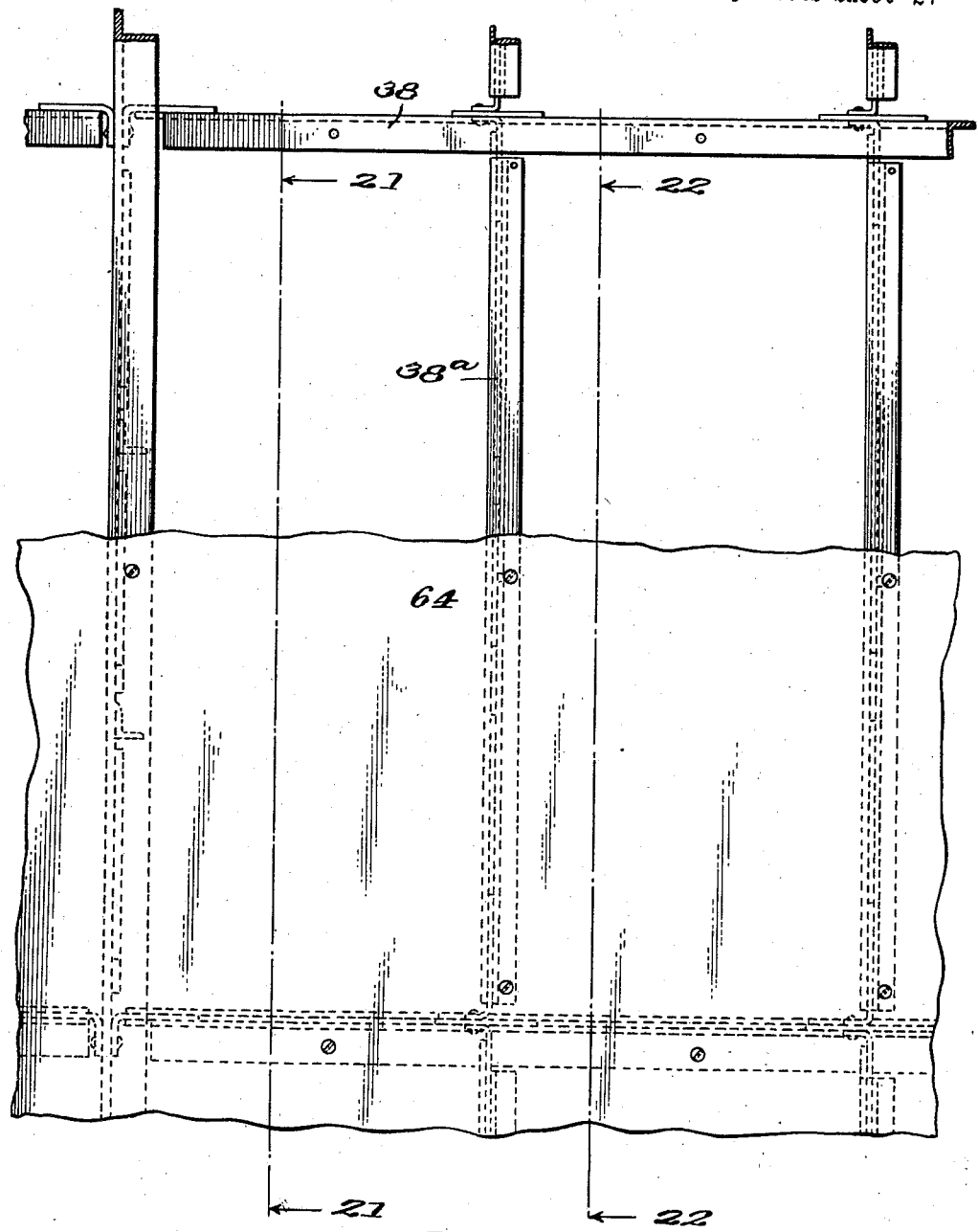

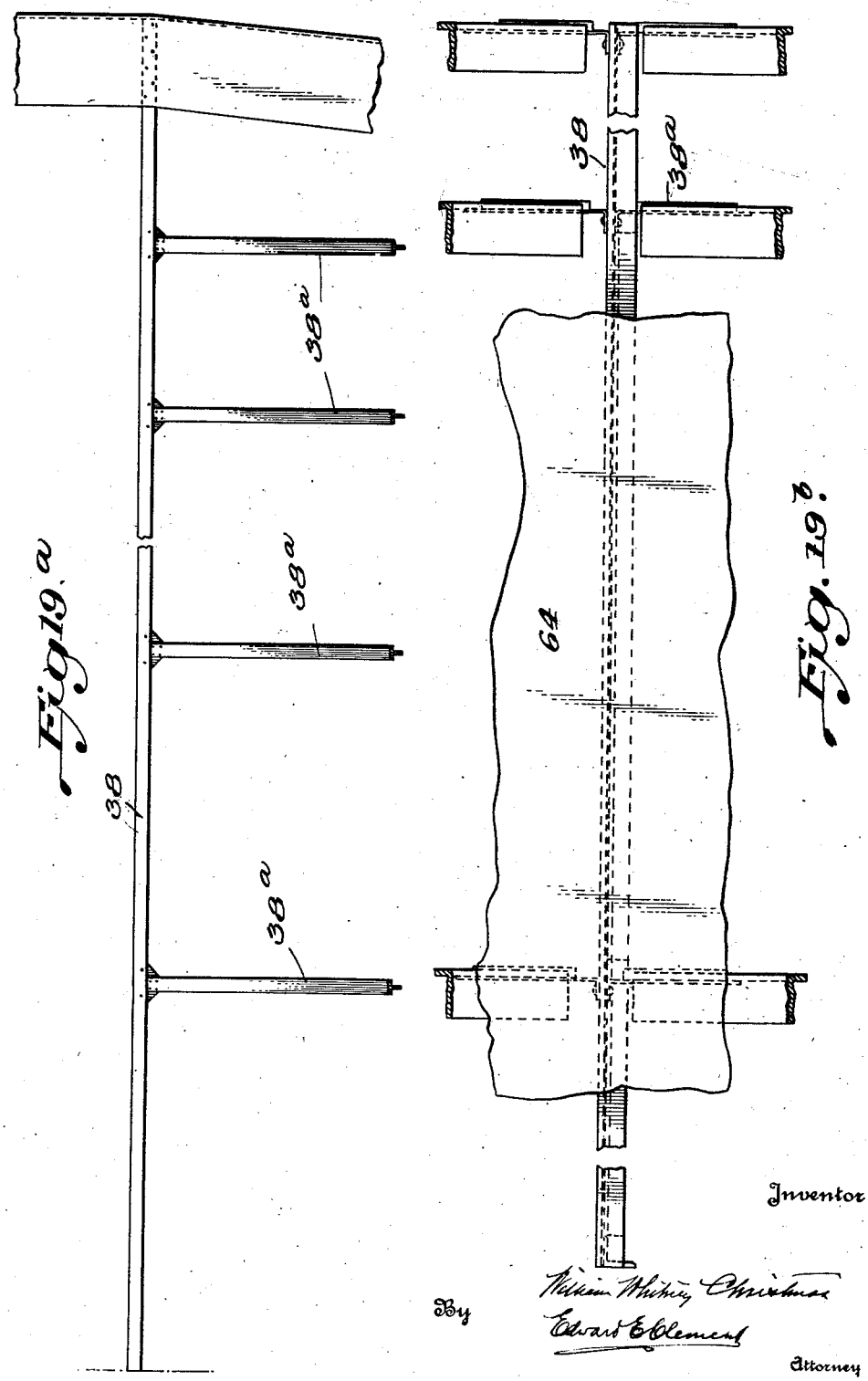

May 26, 1931.  W. W. CHRISTMAS  1,806,586
AEROPLANE
Filed Nov. 8, 1929  41 Sheets-Sheet 29

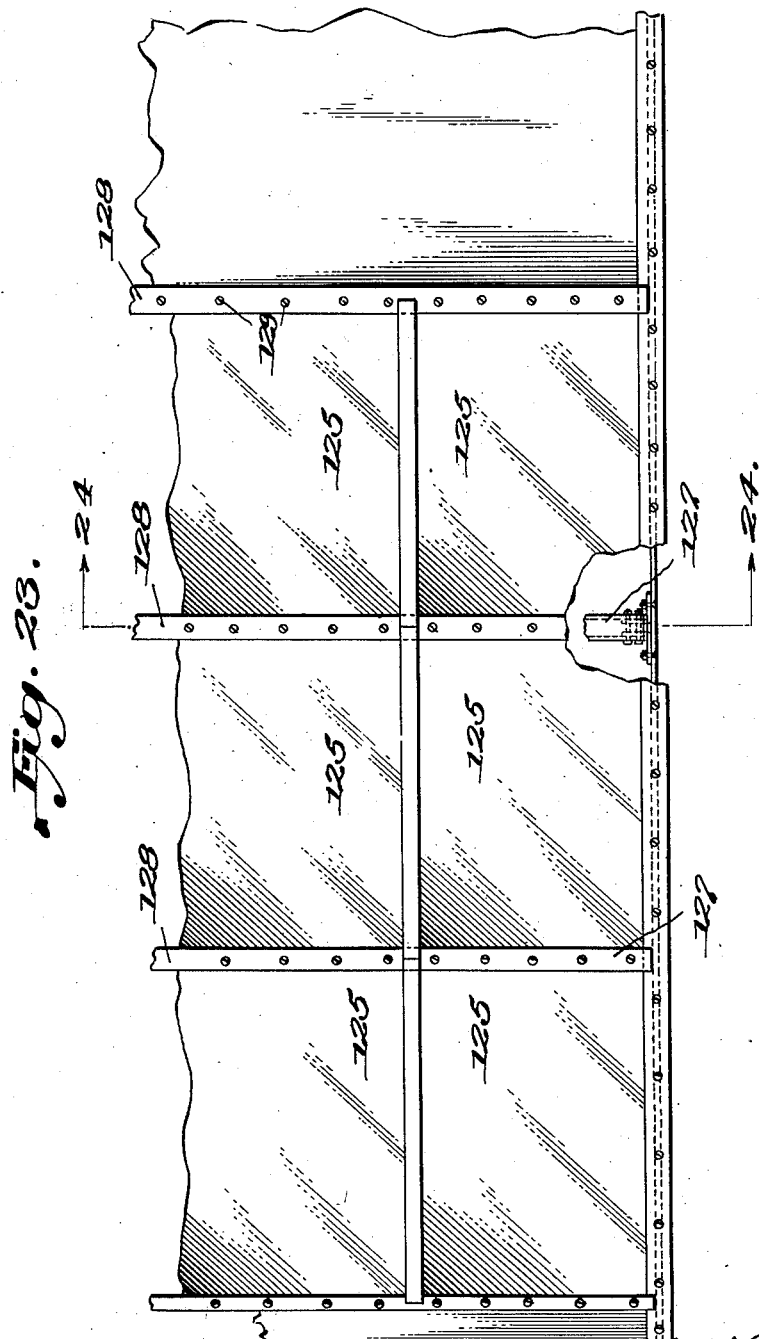

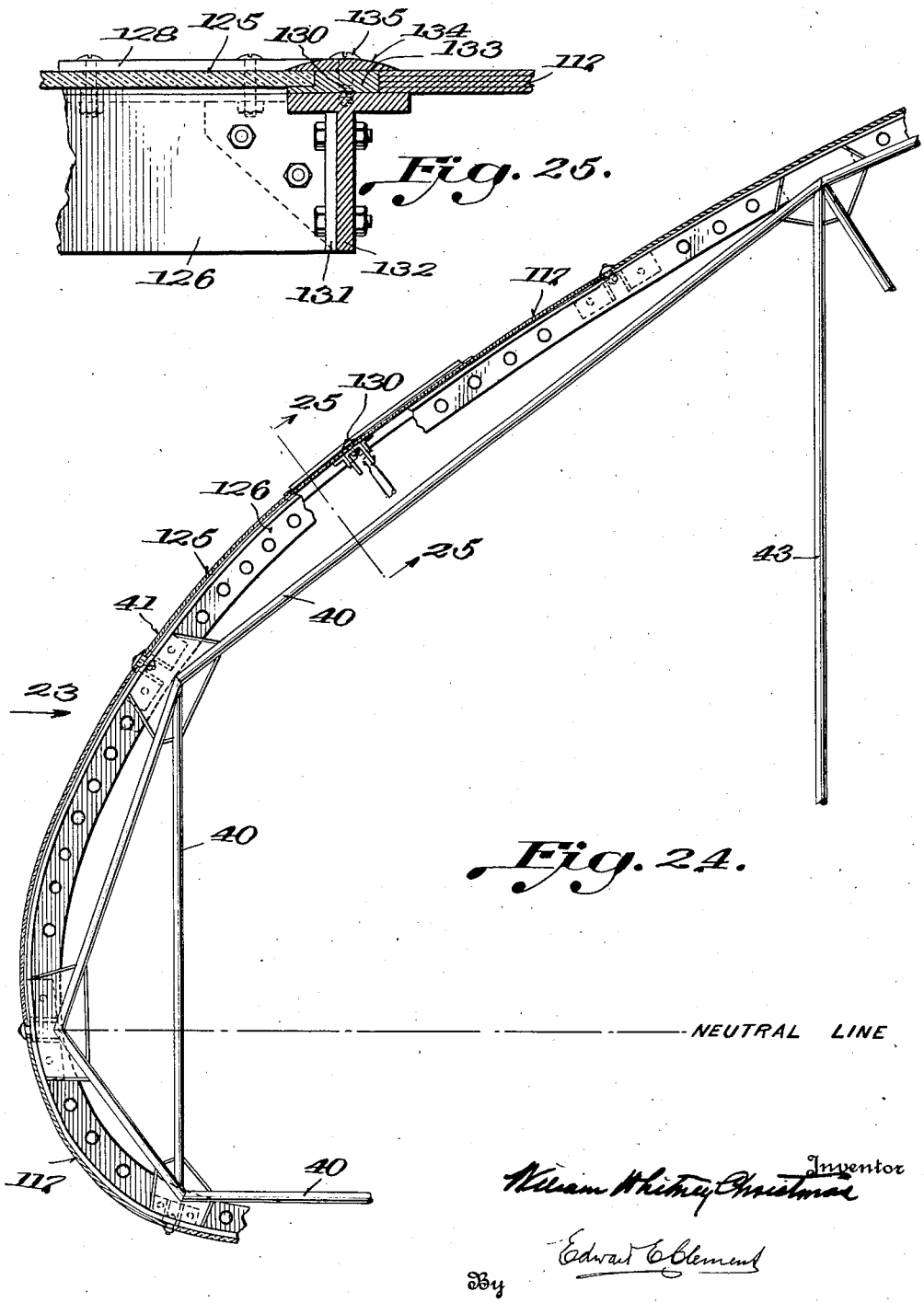

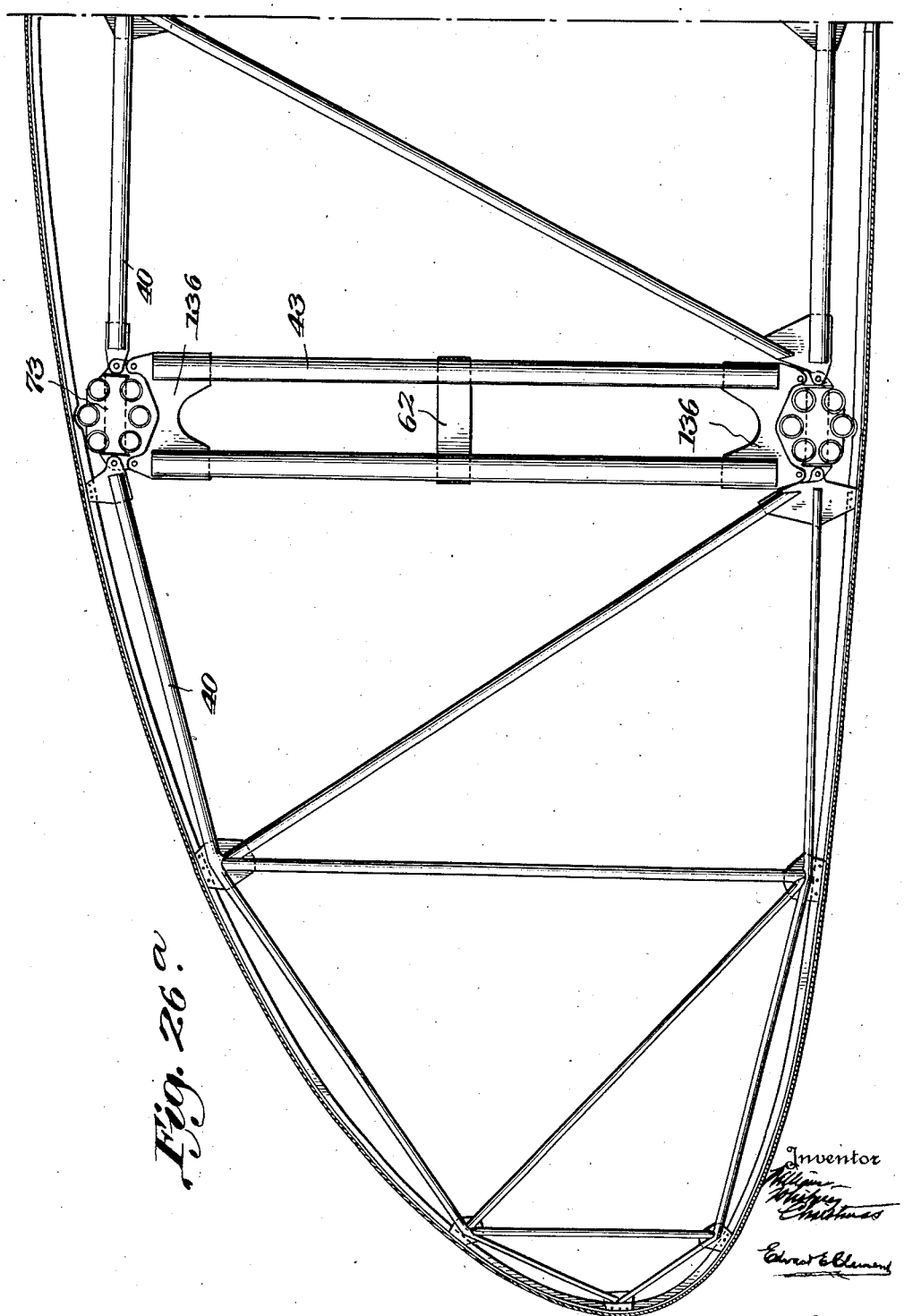

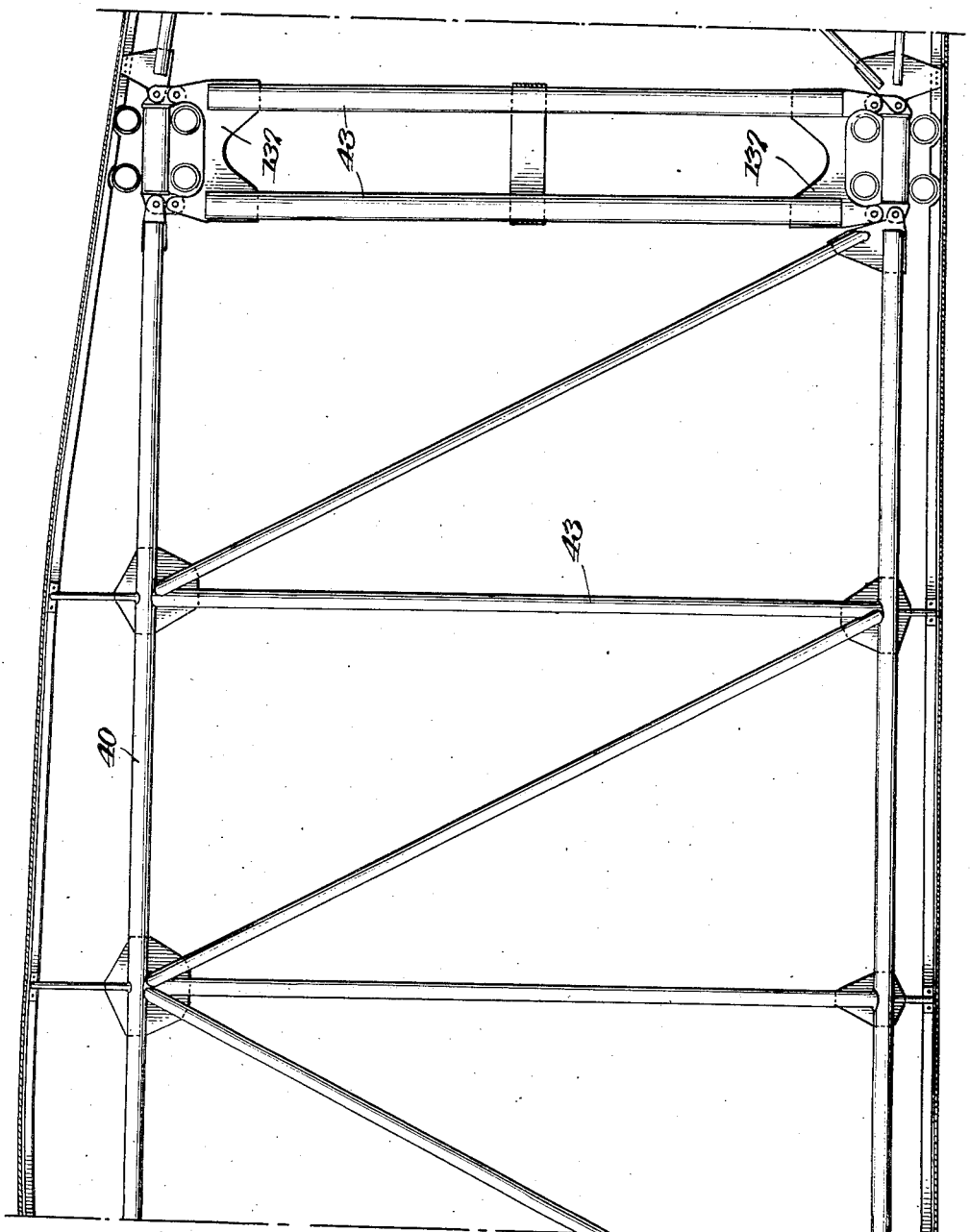

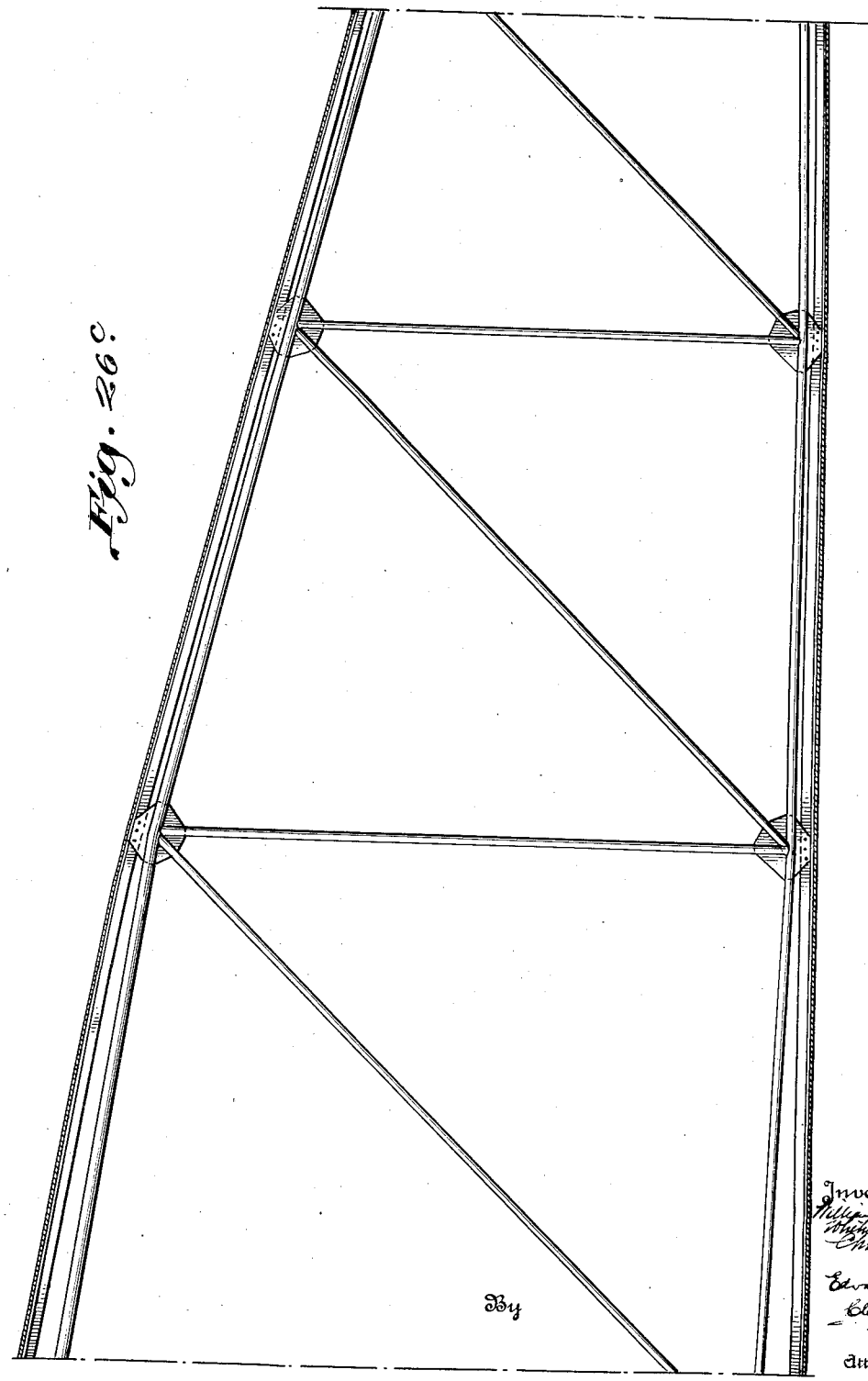

May 26, 1931. W. W. CHRISTMAS 1,806,586
AEROPLANE
Filed Nov. 8, 1929 41 Sheets-Sheet 35
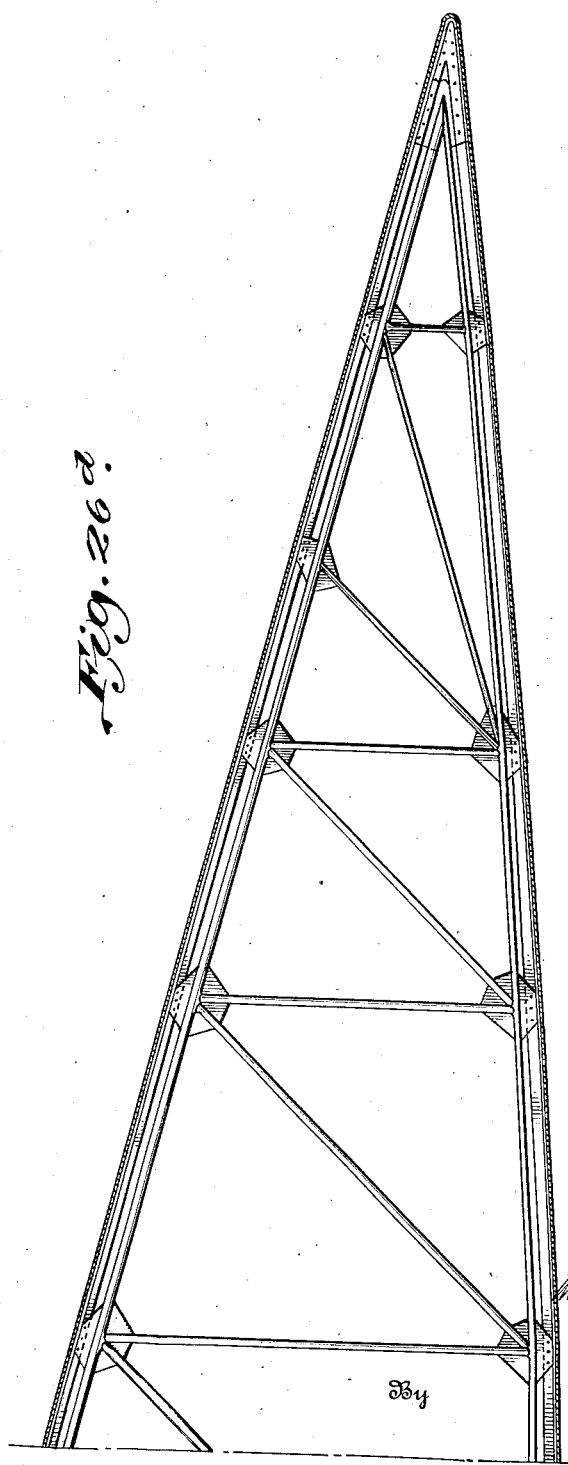
Fig. 26ª.

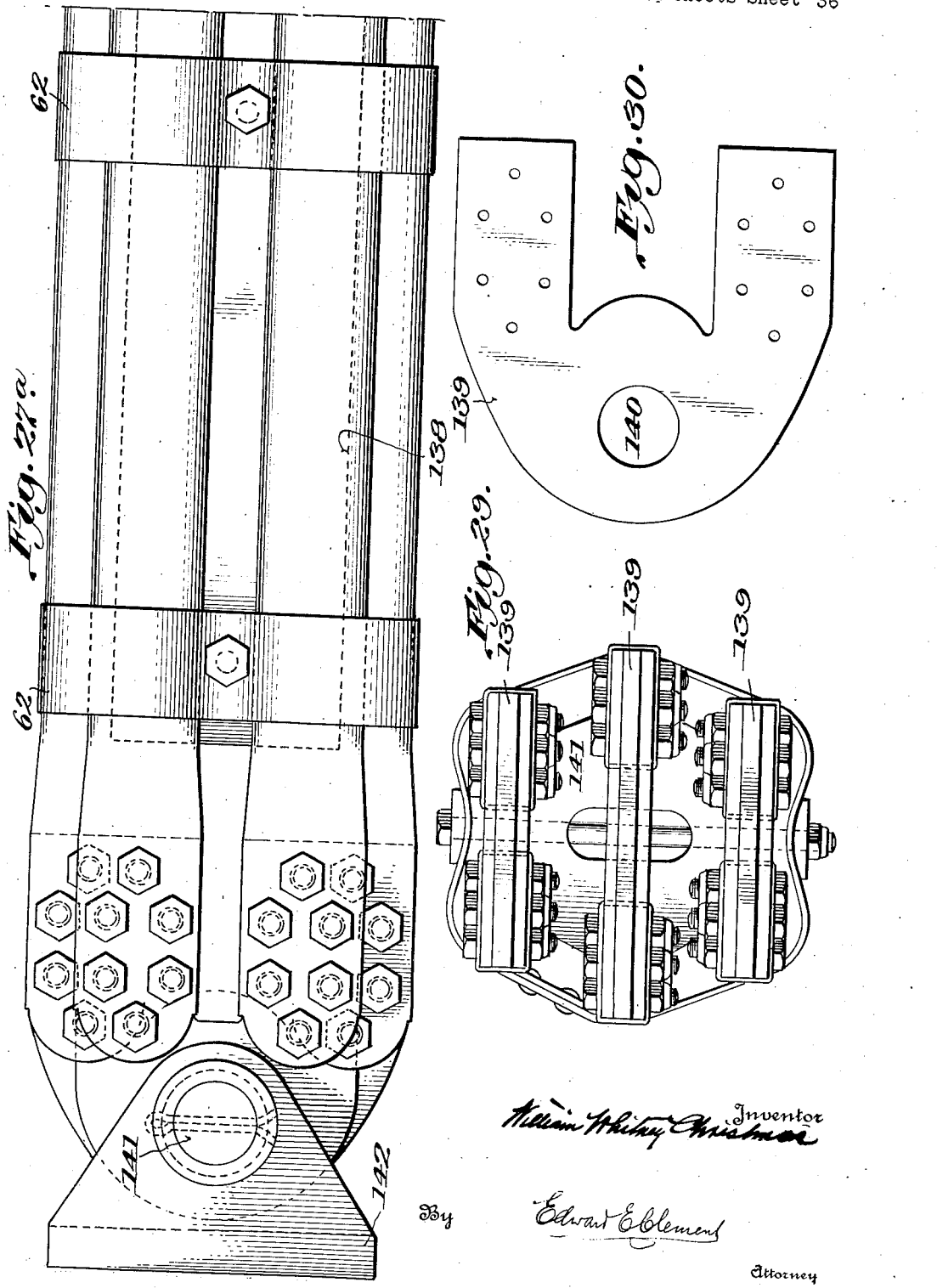

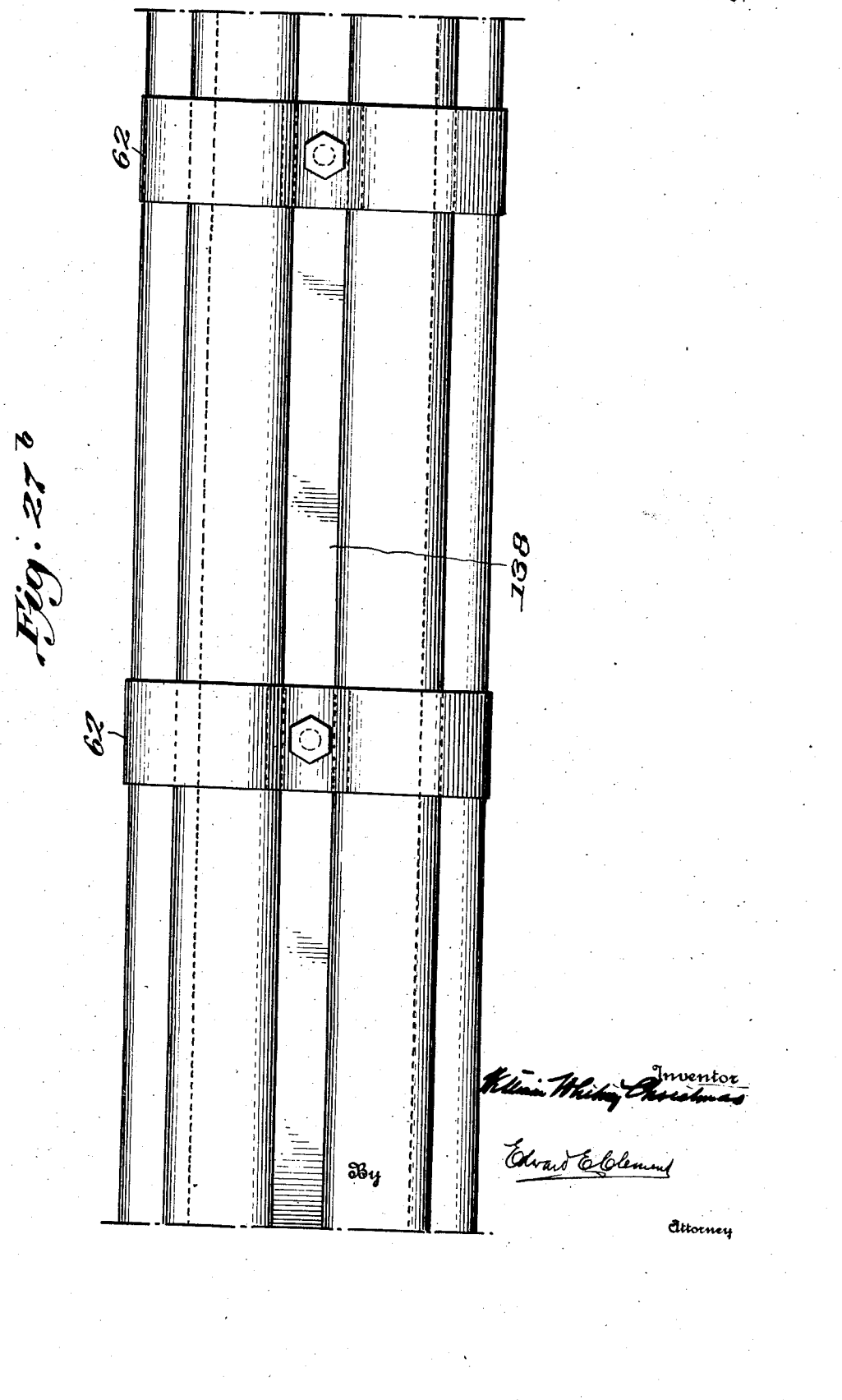

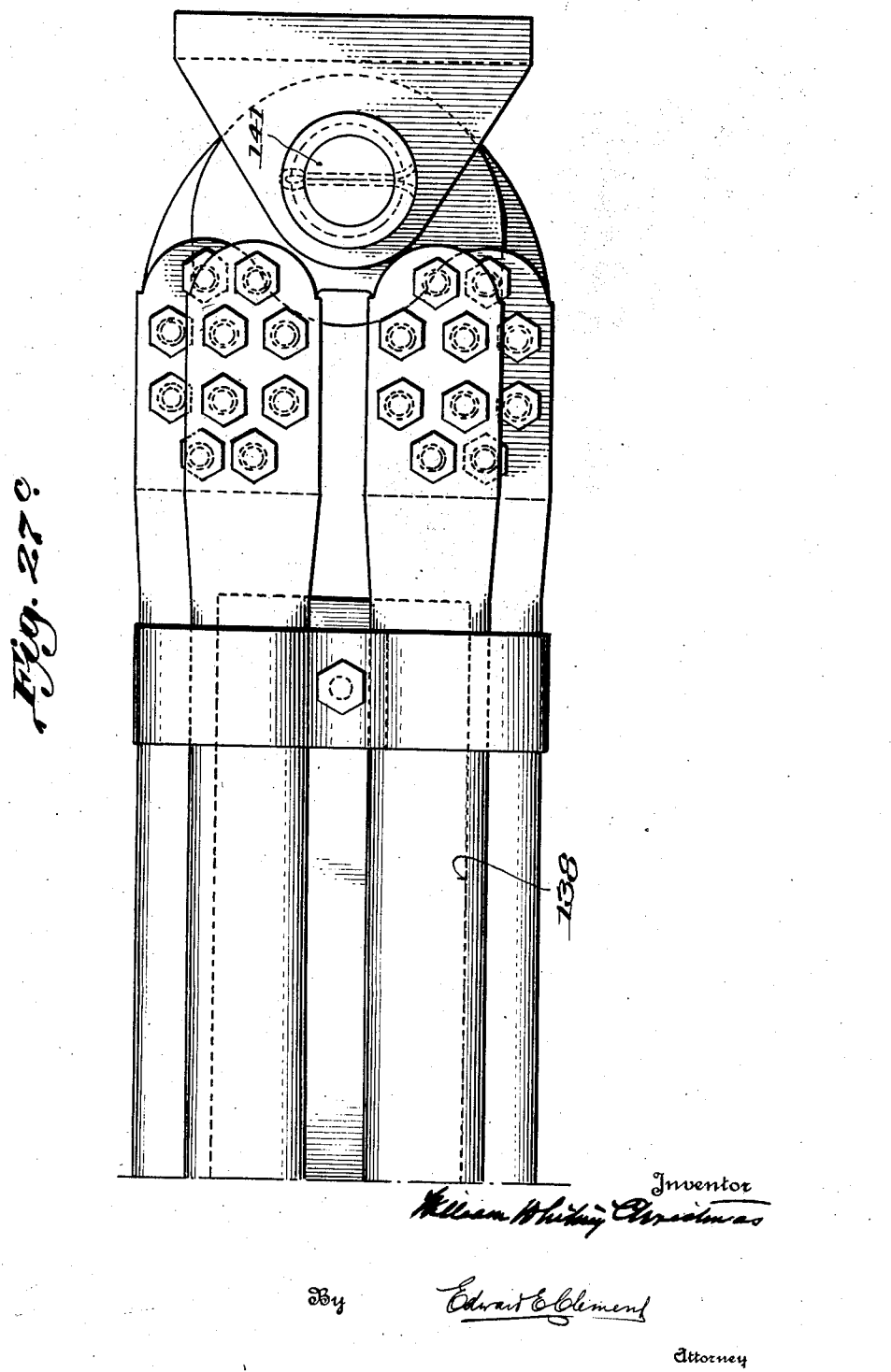

May 26, 1931.  W. W. CHRISTMAS  1,806,586
AEROPLANE
Filed Nov. 8, 1929   41 Sheets-Sheet 39
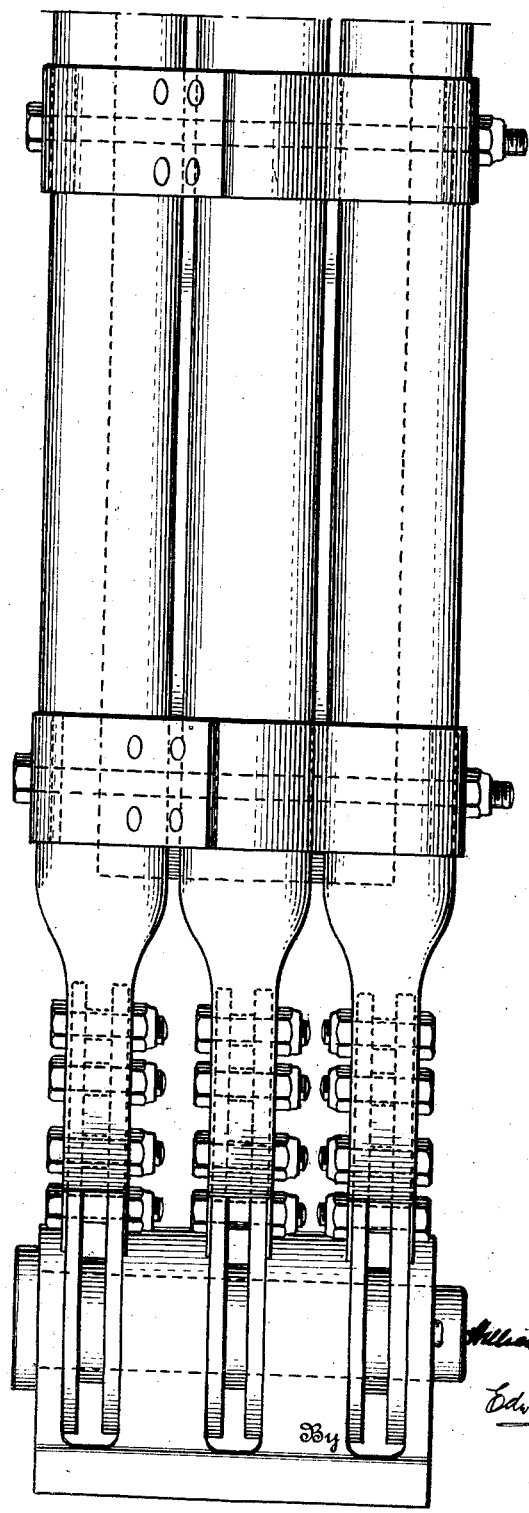
Fig. 28.ᵃ

May 26, 1931.   W. W. CHRISTMAS   1,806,586
AEROPLANE
Filed Nov. 8, 1929   41 Sheets-Sheet 40
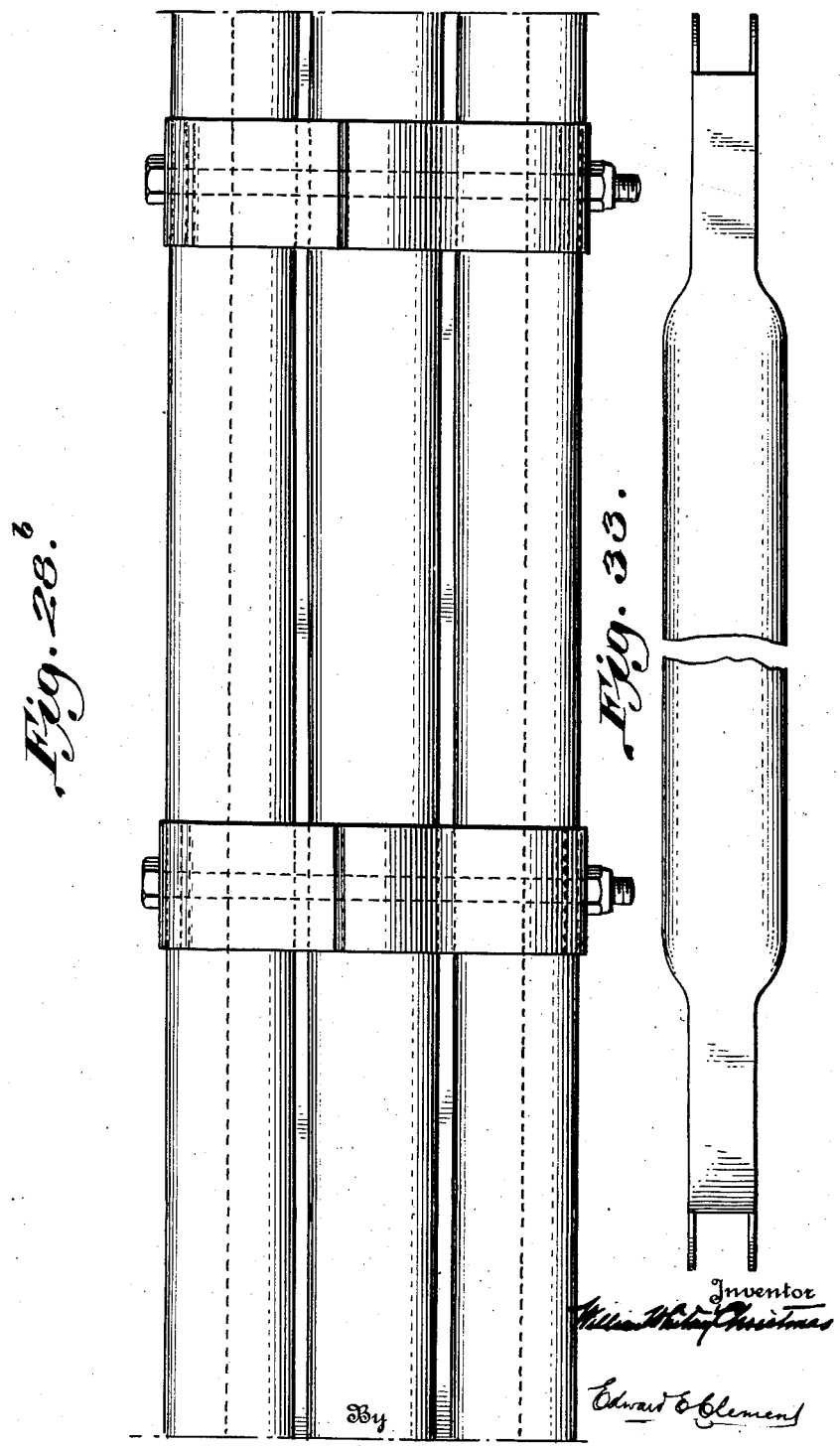

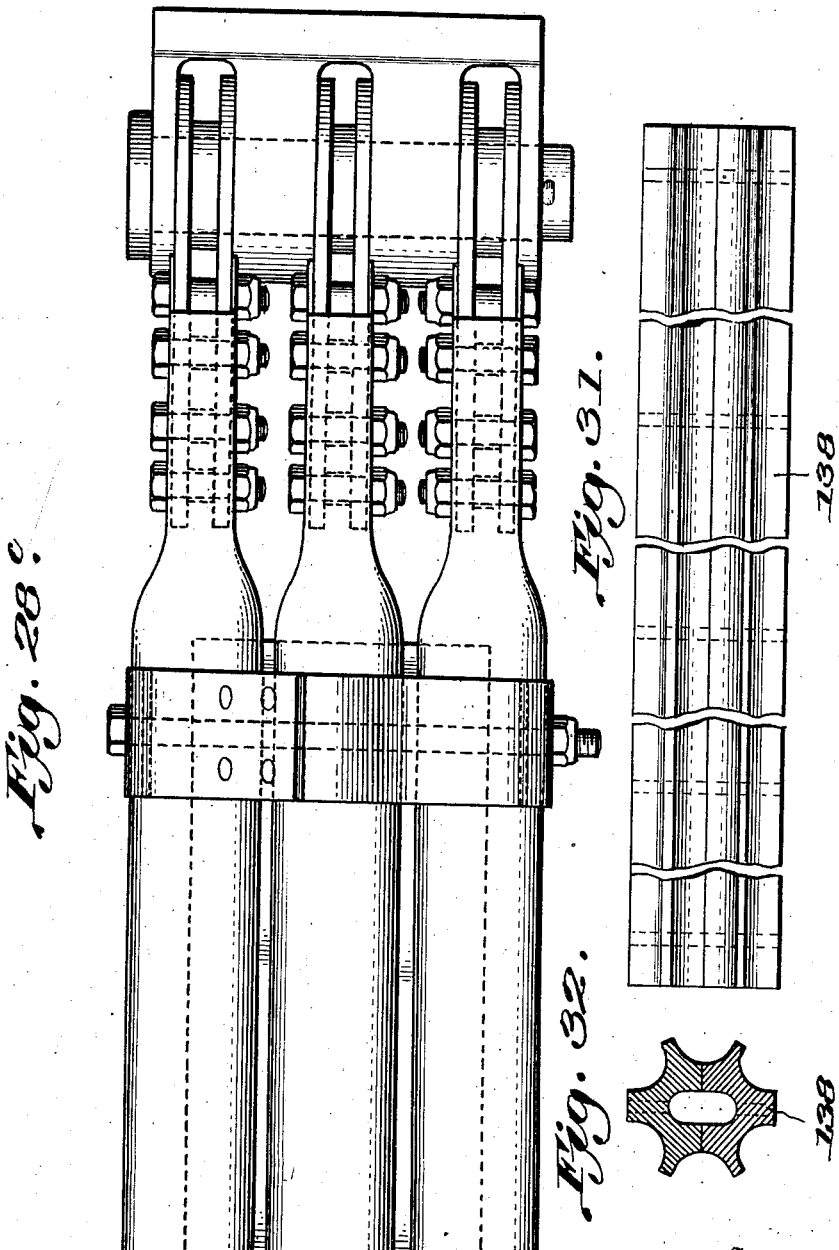

Patented May 26, 1931

1,806,586

UNITED STATES PATENT OFFICE

WILLIAM WHITNEY CHRISTMAS, OF NEW YORK, N. Y., ASSIGNOR, BY MESNE ASSIGNMENTS, TO THE GENERAL DEVELOPMENT COMPANY, OF HARTFORD, CONNECTICUT, A CORPORATION OF CONNECTICUT

AEROPLANE

Application filed November 8, 1929. Serial No. 405,805.

My invention relates to the art of aeronautics and particularly to aeroplanes used for commercial purposes. Heretofore, the machines designed and used for such purposes as the carrying of passengers, mail, and express packages, have been limited in their capacity, with a wing area usually not exceeding a few hundred square feet. Public necessity however for the rapid and economical movement of persons and goods, is producing a concentration of effort in the direction of the commercial plane, and the invention which I shall present herein has for its object the provision of such planes on a large scale, that is to say, having a very much greater wing spread and area and therefore lift than any machines heretofore in use, with attendant advantages of safety, capacity, ease of handling, and comfort. The present invention is in the nature of an improvement or rather a detailed working out of the inventions disclosed and claimed in my prior copending applications Serial No. 374,449 filed June 28, 1929, Serial No. 379,269 filed July 18, 1929, Serial No. 398,060 filed October 7, 1929, and Serial No. 398,061 filed October 7, 1929. In said prior applications I have disclosed and claimed the principal underlying features of my aerofoil, or flying wing. In all these applications, including the present one, my invention contemplates a machine designed exclusively for commercial purposes, with every pound of weight that can be saved with safety, put into pay-load.

I attain my objects by the use of the same principle I have heretofore disclosed, of a continuous homogeneous cantilever truss of uniform figure for the aerofoil, making the latter of such shape and dimensions as to furnish the required lift, and in particular of such a vertical dimension as to permit passengers, freight power plant and all other weight to be carried to be placed within the aerofoil itself without disturbing its uniform figure, that is to say without enlargement or fuselage of any kind or without disturbing the true aerofoil itself. As previously described and claimed, I provide window lights or other forms of opening in the aerofoil to furnish both illumination and clear vision to the passengers and personnel of the plane. I locate permanent seats for the passengers in such manner and on such a deck structure, within the aerofoil, that the live weight in general is balanced during operation; and I so locate all the ancillary or subsidiary features of convenience or necessity with relation to the center of lift and to the mass of passenger seats as to provide for a general balance of the live load and also of the dead weight of freight, mail sacks, and so forth.

In order to provide a wing spread of approximately 250 feet or more to carry the weights intended, I have been forced to very carefully design the structure of my trusses, and have solved numerous problems in regard thereto as well as in relation to disposition and comfort of the passengers. For example, I locate in the rear of the passengers' seats a large compartment which I have called "grand salon" and around this to the sides and the rear, that is toward the trailing edge, I locate rest rooms, kitchens, the captain's and crew's quarters, radio rooms, mail clerk's racks, and so forth. The "grand salon" is for the passengers, and its particular function is that of a dining room although it may be used for other purposes. In order to insure head room and a proper supporting surface under foot I have designed certain of my ribs and the truss members, including the spars, where they pass through the salon and in fact in all the central portion of my aerofoil, with arches or openings to permit free movement of the passengers, the location of tables, and communication with the kitchens and other quarters. These arches involve structural forms based on well understood engineering principles, pertaining to both truss members and architectural members, and the floor, which must be solid and firm enough to give confidence, without unduly adding to its weight, is constructed of specially designed truss girders carrying a ply-wood flooring surface approximately ⅜ of an inch thick. In the crew's quarters, and other portions of the interior which are not usually traversed by passengers, the flooring can be made somewhat lighter.

In addition to the general features of my invention which are referred to above, many other features will sufficiently appear from the detailed description hereinafter. Thus, I have a special construction of spars, special arrangement of thrust members and braces for my trusses, and a special method of applying, supporting and covering the superficial structure and outer skin of the aerofoil.

My invention is illustrated in the accompanying drawings in which:

Fig. 1 is a plan view of my improved plane.

Fig. 1a is a front view of an aerofoil showing the wing extensions forming a dihedral angle with the flat central portion.

Figs. 2, 3, and 5 are side views of the same showing several modifications in point of detail.

Fig. 4 is a plan view of a modification.

Figure 6:
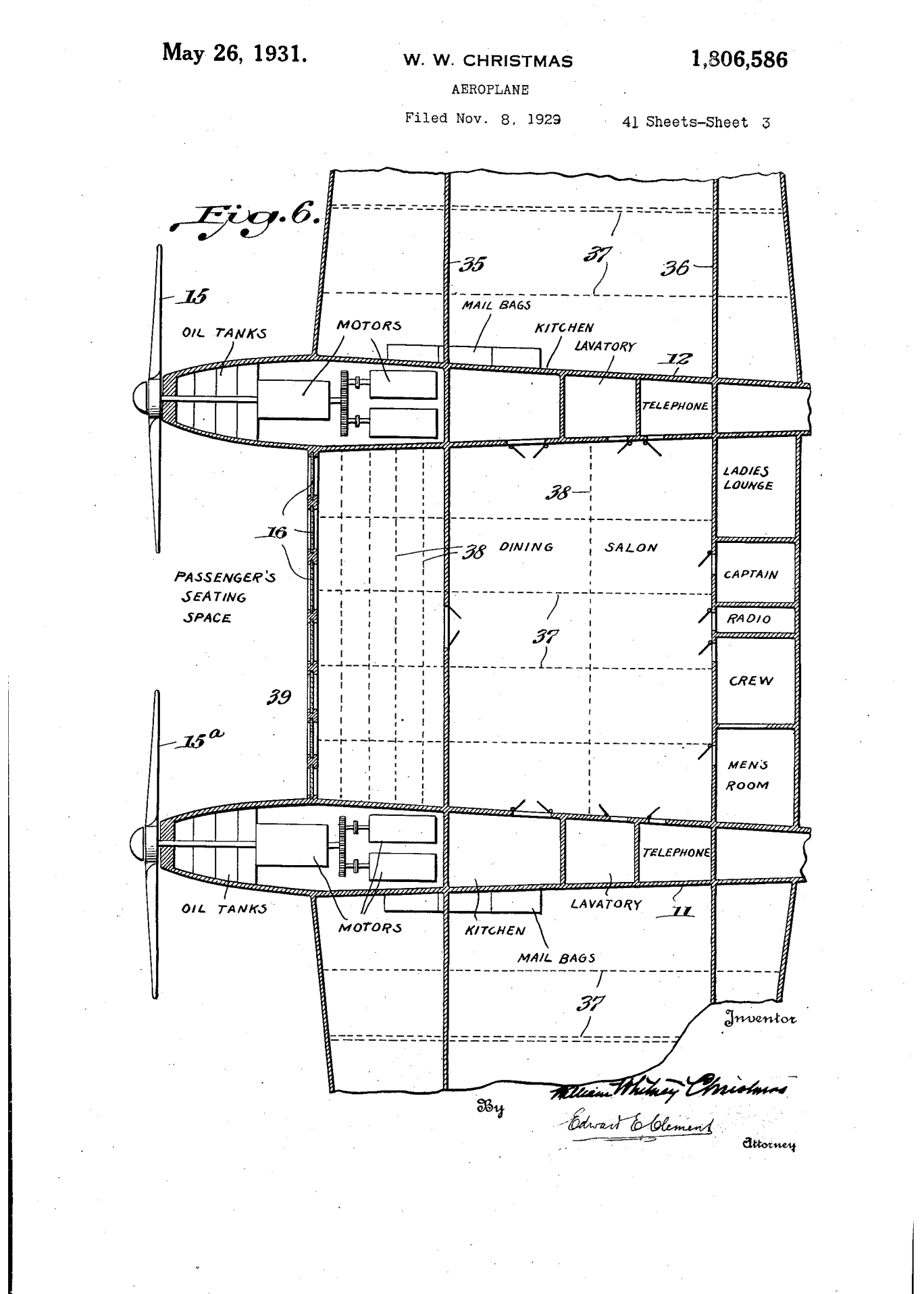

Fig. 6 is a sectional view on a somewhat enlarged scale on the line 6—6 of Fig. 5.

Figs. 7a, 7b, 7c, 7d, and 7e taken together and regarded as one figure show on an enlarged scale one of the ribs in the central or passenger carrying section of my aerofoil.

Figs. 8a, 8b, 8c, 8d, and 8e show on an enlarged scale a main rib with compression rib assembly.

Figs. 9a and 9b taken together constitute a plan view of the compression rib assembly shown in Fig. 8, illustrating also the connection between the rib and the front and rear spars.

Figs. 10a, 10b, 10c, and 10d taken together constitute a side view of arch construction through the front spar, and Fig. 10e is a fragmentary top view of front spar arch assembly shown in Fig. 10.

Fig. 11 is a diagrammatic plan view of the left wing structure, with the upper skin removed, showing compression rib assemblies.

Figs. 12a, 12b, 12c, and 12d taken together constitute a sectional view through the center section, in the salon, showing the arch construction.

Figs. 13a and 13b together constitute a side view of the upper covering truss member, and 13c is a detail of the expansion joint between the truss members.

Fig. 14 is a sectional view thereof on the line 14—14 of Fig. 13a.

Fig. 15 is a section on the line 15—15 of Fig. 14.

Fig. 16 is a side view of a typical upper chord joint, at the front truss.

Fig. 17 is a section on the line 17—17 of Fig. 16 showing a six tube truss, top and bottom.

Fig. 18 is a plan view of the same.

Fig. 19 is a plan view of the floor girders with a portion of the flooring applied thereto.

Figs. 19a and 19b are respectively a plan view of girders and joists without flooring and on a somewhat large scale with a portion of flooring laid.

Figure 20:
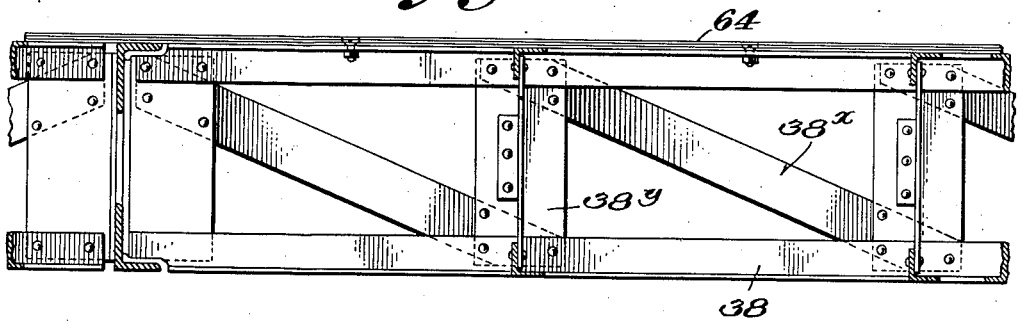

Fig. 20 is a side view of one of the girders showing the method of making joints and applying braces.

Figure 21:
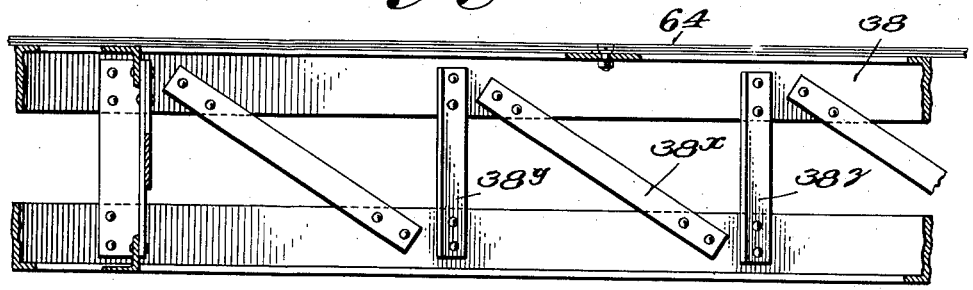
Figure 22:
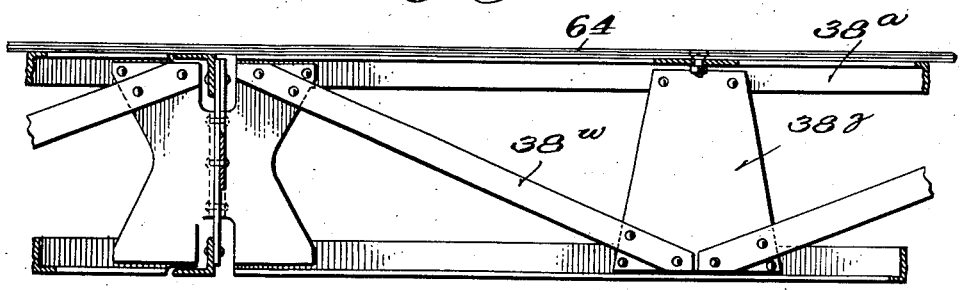

Fig. 21 is a section on the line 21—21 of Fig. 19 and Fig. 22 is a section on the line 22—22 of Fig. 19.

Fig. 23 shows the center section of the window layout in the leading edge, using ⅛ inch triplex glass in metal frames.

Fig. 24 is a section through the leading edge and the upper surface adjacent thereto of the central portion of the aerofoil, taken on the line 24—24 of Fig. 23.

Fig. 25 is a detail section view taken on the line 25—25 of Fig. 24 showing the method of securing the glass in the metal frames of Figs. 23 and 24.

Figs. 26a, 26b, 26c, and 26d taken together show on an enlarged scale a main rib with compression rib assembly, with a modified arrangement of the front and rear spars.

Figs. 27a, 27b, and 27c together constitute a side view and Figs. 28a, 28b, and 28c taken together constitute a view at right angles thereto, of a column formed of tubular members bolted to brackets at both ends, showing the typical tubular construction which I employ.

Fig. 29 is an end view of the parts shown in Figs. 27 and 28.

Fig. 30 is a detailed view of one of the pivot plates removed from the assembly of Figs. 27, 28, and 29.

Fig. 31 is a side view and Fig. 32 is an end view of the spacer shown in dotted lines in Figs. 27a and 28.

Fig. 33 is a detail of one tube in the assembly of Figs. 27 and 28.

Referring to Fig. 1, 1 is the aerofoil structurally arranged as shown in Fig. 6, carrying the outriggers 11—12 extending parallel across the plane and carrying at their rear ends the tail group 10. The dimensions of the aerofoil 1 are approximately 250 feet from tip to tip and 55 feet on the chord in the middle. The dimensions of the outriggers 11—12 are sufficient to permit the installation therein of the power plant 13—14 for the propellers 15—15a. As shown these power plants include three or four engines or more working through suitable clutches onto a master gear secured on the main propeller shaft. As shown in Fig. 1, the space between the outriggers in the aerofoil, which is approximately 40 feet wide and 55 feet on the chord, with a headroom of 7½ to 9 feet, is divided by suitable partitions into such compartments as may be desired, as indicated in Fig. 6, and is provided with window lights 16a in the top and in the bottom of the plane and other lights in the leading edge. The pilot house 17 has lights 18 in its roof and floor, as well as in the front and sides, so that the pilot may have clear vision in all directions.

Referring particularly to Fig. 2, the projection of the pilot house 17 is shown in dotted lines, but the window lights are not shown. In this figure, the companionway 19 is shown, with the stairway leading therefrom through the landing leg 20 to the lower end thereof where a hinged section of the stairway 21 may be let down to reach the ground. When in flight, this section 24 may be turned up as indicated in dotted lines, forming a door to close the opening over the stairway. Above the stairway and centered in the outrigger structure 12 is a fuel tank 22 and in the landing leg beneath and forward of the stairway is another fuel tank 23. The landing leg is provided with one or more pairs of wheels 25, which may be mounted upon a separate truck with springs or any other form of shock absorber supporting the leg, or otherwise as may be desired. A supplemental leg 26 may be provided with a wheel 27, and the usual skids 28 may be mounted at the rear ends of the outriggers or otherwise on the tail group. I have indicated in Fig. 2 a 4-wheeled truck for each forward landing leg; but in practice, owing to the necessity for turning in taxiing, some of these wheels may be omitted and the supplemental landing legs 26 may be also omitted or they may be moved back in place of the skids 28, according to circumstances and particularly according to the nature of the terrain where landings are to be made.

In Fig. 3 I have shown the same companionway 19 and the stairway 21, the same fuel tanks 22—23 but instead of locating the pilot in the center of the leading edge as in Figs. 1 and 2, I locate the pilot house on the tail group as shown at 29. There are certain advantages in this location which cannot be overlooked, as will be observed particularly in Fig. 4, where the pilot house is shown in plan supported on the truss structure of the horizontal stabilizer 30 in the tail group. Access to this pilot house would be through one of the outriggers 11 or 12 and then through the truss frame of the stabilizer 30 which has sufficient headroom for a man to pass through it.

In addition to the position shown for the pilot house in Figs. 1 to 4, I may either in addition or as an alternative thereto locate a pilot house 31 in one or each of the landing legs 20, as indicated in Fig. 5. In this figure fuel tanks are shown at 32 and 33, in the outrigger truss and in the landing leg respectively, and the pilot at 31 is located forward of the fuel tanks, with window lights in the sides and front of his compartment for clear vision.

Referring now to Fig. 6, 35—36 represent the two spars of the aerofoil, 11—12 are the structures of the outriggers or transverse trusses. 16 are the front window lights, 38 represents the framing beneath the floor of the central section, which in general may be designated as 39, being the main carrying section of the wing. More specifically 37 represents the ribs of the aerofoil, and it will be understood that no attempt has been made to insert the complete framework in this figure, but merely to indicate the method of framing. I preferably employ duralumin girders at 38, and purlines of the same material but lighter in weight, supported between and upon the girders. The floor, of plywood approximately ⅜ in. thick for the passengers and somewhat less for the crew, is laid over the purlins and girders, being spaced apart from the outer section on the lower face of the aeroplane, by the depth of the girders, which may be about 6 inches. By this method of construction a very light and very strong frame is secured which yields all of its saving to pay-load. In the drawing I have shown a dining salon in the rear of the passengers' seating space and around this salon I have shown opposite and balanced compartments for kitchen, lavatory, telephone, ladies' and men's lounges, captain, crew, and radio. The location of the kitchen, lavatory and telephone compartments in the truss structure of the outriggers is merely a matter of convenience, as it will be observed that these structures 11—12 are built into and form a part of the aerofoil structure itself, or put in another way, the aerofoil is built continuously through the outrigger structures, since the spars 35—36 are continuous throughout from tip to tip and the associated bracing and framing structure is the same. The outriggers therefore are not separate structures but parts of the wing structure except as to their projecting ends or nacelles. They are not to be confounded with fuselages, of which I have none.

Outside of the outriggers but within the aerofoil, space is provided for stowage and handling of mails, freight and express matter. This however has been described and claimed in my prior copending applications hereinbefore referred to.

It will be observed that I have utilized the forward end of the outriggers or the nacelles carrying the propellers, for the storage of oil tanks, containing oil for the engines. As shown in Fig. 6, these tanks are shortened so as to lie entirely beneath the propeller shafts, but obviously their shape and dimensions may be altered at will without departing from the spirit of the invention. It should be further remarked that the fins 30a in Fig. 4 are made adjustable.

In Figs. 2, 3 and 4, I have shown couplers 40 mounted on vertical pintles secured to the opposite ends of the chassis of the machine, for the purpose of cooperating with complementary couplers on tractors (not shown) for the purpose of taxiing the plane into position at the landing stage or under shelter. The size of these planes renders it difficult to handle them under their own power on the ground, and the couplers shown may be of any suitable or desired type. The form illustrated is the same as the standard coupler approved by the Railway Car Builders Association for American Railways, comprising a pair of horizontal interlocking jaws, one carried in the present case by the chassis at 40 and the other carried by the tractor. These jaws interlock inside a square tubular guard, which being pivoted on a vertical pintle or coupling rod to the chassis and to the tractor respectively, permit side play, so that the tractor may turn and push or pull the chassis of the aeroplane in any desired direction. For uncoupling, locking bolts or rods are lifted so as to permit the swinging jaws to separate. I do not claim the specific couplers as a part of my invention but I shall claim the use of such couplers on the chassis of an aeroplane for the purpose stated, which to the best of my knowledge has not heretofore been accomplished.

Having thus described the general features of my ship which are essentially the same as those described in my prior copending application, Serial No. 398,060, I shall now present several novel structural features which I have invented to meet the contingencies peculiar to planes of the size and for the purpose herein set forth. It will be understood, of course, that to build a plane of 250 foot or more wing spread involves very much more than merely building an aeroplane on a large scale, and the first feature of difference which I have turned to account is the depth of the plane or aerofoil itself, which renders it possible to dispense with a fuselage entirely. The aerofoil being supported from tip to tip upon an air cushion, and having head room within it sufficient for the movement and storage of persons and goods, would seem to present an ideal condition for the uniform distribution of weight over an extended area uniformly supported. I have found however that there are limits to this distribution, although under proper conditions storage of goods and the like may be effected to within a very short distance of the tips of the wings. One reason for centralizing a considerable portion of the weight lies in the necessity for lateral stabilization. If the plane is to be operated without a fuselage, as a ship of the flying wing type only, then other means must be adopted to lower the center of gravity and prevent side slip or lateral instability. I have described and claimed in a prior copending application an aerofoil which meets this condition, in which I effect a combination of wing extensions forming a dihedral angle, with the central portion between them horizontal. This combination does not restrict goods and passengers to the central portion only, but it renders it advisable that the weight in the central or horizontal portion of the aerofoil shall be greater than in the projecting wings. This means that the mechanical structure of the central portion must be modified to a certain extent to give increased weight and carrying capacity as well as comfort for passengers. The amount of space available is more than ample, as in the ship herein specifically described the central portion alone has an area of about 3000 square feet. In larger ships, this will be correspondingly increased.

In a water ship the essential foundation features are the keel and the ribs. In my present ship the corresponding essential features are the socalled spars or longitudinal trusses, and the ribs. In Fig. 6 37 designates the ribs in general, 35 designates the front spar and 36 the rear spar. The two spars are cantilever trusses, each outrigger 11 or 12 is a transverse cantilever truss built into and forming a part of the main structure, as will presently appear more in detail, and each rib 37 is in effect a cantilever truss. Moreover, the longitudinal truss members of the spars 35 and 36 pass through the transverse parallel structures of the ribs, and the members of each are integrally connected with the members of the other so that when the framing is finished, it forms one unitary whole.

While I have thus chosen to frame my ship as a unitary and homogeneous structure, not unlike a bridge truss in principle, and accept the tendency of such structures to transmit strains from one portion to another as well as to produce distortion under compression and particularly under torsion strains, I have nevertheless taken advantage of the free character of an aerofoil, to provide self adjustment and to prevent any distortion due to direct or torsional strains. The first main principle I employ for these purposes is that of building up my entire framework, so far as practicable, out of metal tubes, such as for example tubes of molybdenum steel properly heat treated or conditioned ranging in diameter from $\frac{3}{8}$ of an inch to $5\frac{1}{2}$ inches, or more. It should be noted that no matter how strains may be transmitted to or through a tube, or member of circular section, if properly proportioned and of proper weight it retains its figure and does not become distorted. The weight moreover may be less than that of other forms such as the rectangular, which exhibit their greatest resistance in one direction only. The circular or convex form also resists fatigue better than other forms.

There are two principal types of ribs employed in this ship, viz., those in the central portion, where provision must be made for free circulation of passengers and personnel through the various cabins, salon, etc., and those in the outer portions of the wing where a gangway, if required at all, is of secondary importance. A rib of the first type is illustrated in Figs. 7a, 7b, 7c, and 7d, these figures constituting together a side view of a truss rib comprising an outer frame 40 extending from the entering edge 41 to the trailing edge 42, with its upper and lower tubular members connected by tubular posts 43, the forward end of the frame being strengthened by the diagonal braces 44 and 45 and the tail of the frame being similarly stiffened by diagonal braces 46, 47, 48, 49, 50, and 51. This frame has secured upon it a supplemental web frame 52 which may be of steel or duralumin or other suitable material and may be doubled, with the frame tubes 46 inclosed between two similar parallel fastenings of the web. The web 52 is formed into a series of arches 53, 54, 55, 56, and 57, to attain structural integrity whereby ample space is provided for the passage of persons therethrough, while the web itself takes the place of diagonal braces in the space between the front and the rear spars. The spars 35 and 36 will be presently described, but it will be understood that in Figs. 7a and 7c they are shown in section. As shown each of them has six tubes at the top and six tubes at the bottom in horizontal sets, linked up throughout to form continuous members of the truss from tip to tip of the aerofoil. The upper and lower sets of tubes are connected by vertical posts 58 and 59. The arrangement of these tubes, and even the number of tubes may be varied, but in principle their arrangement remains the same in any case. The posts 58 and 59 are shown as held against spreading by lateral straps 62 and 63 and diagonally braced by tubes 60.

In all four figures, 7a, 7b, 7c, 7d, I have shown in section the floor 64 extending through all the arched spaces 53, 54, 55, 56, 57, and back to the post 43 following the brace 47 in Fig. 7d. Longitudinal girders 38 beneath the floor 64 correspond with the girders shown in dotted lines in Fig. 6 and in Figs. 19 and 20, and it will be understood that these girders extend from rib to rib, and may either carry or may be interspersed with joists upon which the plyboard flooring may rest with uniform support. This will presently be described more in detail.

The tubular frame 40 and its posts 43 as shown, are united by welding so as to form on integral unitary structure. The only departure from this is in the couplings at the head and foot of the front spar 35 and of the rear spar 36. Owing to the nature of the spar structures, and the movements that take place therein and in the ribs, which are in effect trusses at right angles to each other, it is necessary to allow for a certain amount of relative movement, which is attained by terminating the forward and rearward extremities 40a—40b and 40c—40d in coupler heads of plates 65, 66, 67, and 68. Similarly, the terminals 40e and 40f of that portion of the frame 40 which extends into the leading edge 41 of the plane, are welded to coupling heads or plates 69 and 70; while the terminals 40g and 40h of that portion of the frame 40 which extends from the rear spar toward the trailing edge of the structure, are welded to coupling heads or plates 71 and 72 respectively.

The two coupling plates 65 and 69 are united by means of a coupler head 73 the detail of which is better shown in Figs. 16, 17 and 18, and the modification thereof in Fig. 26a. Similarly, the coupling plates 66 and 70 are united by a lower coupler 74 and the head plates 67 and 71 and the foot plates 68 and 72 are united at the rear spar by couplers 76 and 77 respectively. These coupler members may be tubular as shown in Figs. 16, 17, and 18, or may be plates to which the upper and lower spar tubes are fastened, as indicated in Figs. 7a and 7c. In this type of construction, it will be observed that the coupler plates 65, 66, 67, 68, 69, 70, 71, and 72 are united in pairs by vertical tubes 61. The upper and lower ends of these tubes 61 are fastened to the plates in the same manner as the frame ends 40a, 40b, etc. It should also be noted that the diagonal braces 60 which cross the rectangular sections of the front and rear spars in Fig. 7a and 7c, are not connected to the spar members proper but are pivotally connected by rivets or bolts to the coupler plates 65, 66, 69, and 70 of the front spar, and 67, 68, 71, and 72 of the rear spar. Thus, the frame 40 may be considered as composed of a front figure in the leading edge which is rigid throughout, connected to the coupling plates 69 and 70; a middle figure similarly rigid throughout connected at one end to the coupling plates 65 and 66 and at the other end to the coupling plates 67 and 68; and of a tail figure extending rearwardly from the rear spar, rigid throughout and connected to the coupling plates 71 and 72; with pivoted or flexible couplers 73, 74 and 76, 77 for the respective portions of the frame. Each of the couplers 73, 74, 76, and 77 has a double function, since it not only connects the adjacent portions of the frame 40 but also serves as a connector or carrier for the head or foot tubes of its spar. It will be found upon studying the detail of Figs. 7a and 7c or the related Figs. 8a, 8c, 9a, 9b, 16, 17 and 18, that in every case, regardless of the specific form of couplers employed I have attained my object of carrying the spar structures straight through the ribs, and building them into a unitary whole, while preserving sufficient flexibility in each of the intersecting truss members to take care of the strains and stresses communicated to and transmitted through each. In smaller planes, it is quite possible to use dimensions and shapes that will permit strains and stresses in all directions to be taken up and disposed of by the elasticity of the materials employed; but in structures such as the present, which are of great size, and in which materials such as metals must be employed, it is vital to provide for movement of the parts and especially play within limits between parts such as the rib trusses and the spar trusses which are exposed to strains and respond thereto by changes of shape or dimension in different intersecting planes. At the same time I have provided for unity and rigidity of each section of my aerofoil which is exposed to strains and carries weight, as a unit. Thus the leading edge 41 in Fig. 7a and its frame 40 back to the front of the forward spar, are exposed as a unit to forward pressure and to the suction and compression strains produced by the division of the air currents as the ship advances. The central section of the aerofoil in Figs. 7a, 7b, and 7c, with its arches 52 and its rigid frame 40, carries the main load, and in addition contributes as a unit to the lift which supports that load. Similarly, the trailing edge from the rear spar to the point 42 reacts as a unit to the upper and lower air currents leaving the rear edge of the foil. As will presently appear, I provide expansion joints in the longitudinal members of the framing, and the skin or covering of my aerofoil is made of material (such as plywood) which has a certain amount of elasticity; and considering these points with the foregoing description, it will be apparent that I have produced a design for my aerofoil in which within limits there is practically universal motion. In other words, for variations in the air pressure or air movement or air resistance in straight flying or in banking, my aerofoil adjusts itself with as much freedom as and a higher percentage of efficiency than a well built automobile. Furthermore, my frame, including spars and ribs, girders and joists, arch webs and braces, skin and flooring, is all wrought into a fabric which is uniform, homogeneous, unitary, and integral throughout; which is shaped to form a dihedral angle with the weight carrying central section lower than the wing tips; and which has its factors of resistance proportionate to the strains to be resisted and the load to be carried, in all its parts.

The arched rib above described may be used beyond the outriggers 11—12, but it is primarily intended and designed for use in the central section 39 between the outriggers. Beyond the outriggers, are main ribs embodying the same general principles of design, but without the arches. Such a rib is illustrated in Figs. 8a, 8b, 8c, and 8d, which taken together present a side view of a main rib with compression rib assembly. In this case the frame 40 is divided as before into three sections, one forming a closed figure in advance of the forward spar, another forming a closed figure between the two spars, and a third forming a similarly closed figure from the rear spar to the trailing edge. The upper and lower members of this frame are terminally joined to coupling plates 69—70, 65—66, 67—68, and 71—72. Each pair of coupler plates is also connected by a vertical rod 61 joined to them at its extremities, and the upper and lower members of the frame are connected at proper intervals by vertical posts 43 and stiffened by diagonal braces 44, 45, 78, 79, 80, 81, 82, 83, 84, 85, 86, 87, and 88. The struts or posts 43 and diagonal braces 78 to 88 inclusive are all attached at their ends to the upper and lower frame tubes 40, and also to anchor plates 89 at all intersections. At a point intermediate of the two spars the center post is marked 43c, from which the braces incline in opposite directions; and it will be observed that the compression members are given a greater diameter than the tension members, for obvious reasons. In these main rib drawings, and particularly in Figs. 8a and 8c, the showing of the front and rear spars in section is the same as in Figs. 7a and 7c, and will be understood without further description. Extending upward and downward from the strain plates or anchor plates 89 are short tubular posts 90, each of a length adapted to the contour of the outer frame and skin 91 or 92 of the upper and lower surfaces of the aerofoil. In order to secure the plyboard, the outer frames 93—94 are flanged, the tubes 90 being joined preferably to flanged plates which in turn are riveted or joined to the flanges of the frame pieces 93 or 94. In cross section these frame pieces may be either angles or T-frames, the angles being shown.

By this construction and arrangement, it will be noted that my upper and lower frame members 40 are substantially straight and with their posts and braces form a perfect structural truss for the support of the outer frames 93 and 94 and the plyboard skin surfaces 91 and 92. This truss is especially designed to receive and take care of the strains and stresses peculiar to the side wings or projections.

Referring now to Figs. 9a and 9b, these together constitute a plan view of a compression rib assembly such as that shown in side view in Figs. 8a, 8b, 8c, and 8d, and with parts broken away. As shown herein, the upper member of the frame 40 is double, consisting of two members 40x and 40y joined at one end to the coupler plates 65a—65b and at the other end to coupler plates 67a and 67b, these plates also being double or in pairs. Bridging tubes 89a extend across between the members 40x and 40y, and carry the posts 90 which support the outer frame 93. The same construction may be followed with the lower member of the frame 40 between the spars 35 and 36. These compression ribs are shown also in Fig. 11 in plan at 95. In said Fig. 11, the framing of one entire half of the wing is shown, the ribs in general being designated by the numeral 37, the leading edge being marked 41, the aileron frame being designated as 96, the front spar 35 and the rear spar 36. Girders, joists, and diagonal braces are indicated diagrammatically with sufficient clearness to enable those skilled in the art to properly construct my wing.

Figs. 10a, 10b, 10c, and 10d taken together constitute a side view of arch construction through the front spar and Figs. 12a, 12b, 12c, and 12d taken together constitute a sectional view through the center section, in the salon, showing the arch construction. Fig. 10e being a plan view of the parts shown in Figs. 10a, 10b, etc., shows a coupling joint of the upper tubes 35a in the head of the front spar and the vertical posts 58, as well as the head tubes 35a indicated in the side view in dotted lines. On opposite sides of these tubes, and forming arches as well as stiffening the truss, are metal plates or other structural members 97, substantially L-shaped but forming arches 98, 99, 100, 101, 102, 103, 104, and 105 along the spar 35 (see Fig. 6), between the two outriggers. These arches may be inclosed by curtains or doors, or by thin partitions with a central door as indicated in Fig. 6, or they may be left open as indicated in Figs. 10a to 10d inclusive. In any case the effect of the L-shaped members 97 bolted to the groups of tubes is similar to that of the web 53 in Figs. 7a to 7d inclusive. The L-shaped plates 97 like the said webs may be formed of duralumin or if necessary of sheet steel, or other material.

Again referring to the plan view in Fig. 6, it is necessary that the space marked "Dining salon", whatever its use, be kept comparatively open. At the same time, the upper and lower members of the ribs must be connected and upper and lower trusses must be provided to take the longitudinal strains of the central portion of the aerofoil. For these purposes I have designed the form of arches shown in Figs. 12a to 12d inclusive. Taken together these four figures show a continuous truss formed of arch members 106, each arch being opened at the center or key point, and the two members united by an expansion joint shown in detail in Fig. 13c. The spring of these arches are supported upon vertical post structures 43 which are the same as the vertical posts in the ribs between the arches 54, 55, 56, and 57 in Figs. 7a, 7b, and 7c. It will be noted that the passengers' seats, or whatever equivalent equipment may be used as indicated in Fig. 6, extend ahead of the front spar 35, and therefore extend through the arches 53 shown in Fig. 7a in the arched ribs 37. Also it will be observed that the floor girders 38 are shown in section in Fig. 7a and in side elevation in Figs. 12a, 12b, 12c, and 12d. Webs 52 (see Figs. 7a to 7c inclusive) extend from top to bottom of the tubular posts 43, and are provided with arches as described in connection with said Figs. 7a, etc. It will be understood in comparing these figures that the tubes top and bottom marked 40 in the Fig. 12b and in the complementary figures are the same as the upper and lower frame tubes 40 in Figs. 7a to 7d; but the latter figures are typical of the rib only and do not show the structure of the principal girders of the arches of Figs. 12a to 12d. The floor girders of this arched truss construction are shown in detail in Figs. 19, 20, 21, and 22. Referring to these figures, 64 is the floor which is formed of plywood or other suitable material and under the passenger or central portion of the wing is 3/8 of an inch thick. This is laid on the girders 38 and on the joists 38a supported across the girders. The details of bracing by diagonal members 38x and 38w and posts 38y and 38z are sufficiently clear without detailed description. These parts are all preferably made of duralumin, but may be made of steel or other suitable material, more particularly the girders, where speed is sacrificed to tonnage. It is to be noted that in designing this ship, from beginning to end, I have refused to economize weight or mass except where the saving goes into pay-load. Thus, if it would enable a heavier cargo to be carried if I reduced the weight of the floor trusses and joists, I should consider it an object to work for, but inasmuch as any decrease in weight beyond a reasonable factor of safety would not increase the cargo carrying capacity, and would probably decrease the safety of the ship, as a commercial proposition, the safer course must be followed.

Referring to the upper girders in Figs. 12a to 12d, I have illustrated one of these on an enlarged scale in Figs. 13a and 13b. In these figures the flanges 107 are united by a web 108 which is strengthened by diagonal braces 109—110—111 and posts 112. The head and foot flanges 107 are shown in section in Fig. 14, with the web 108 in dotted lines. In this figure, purlines 113—114 are shown riveted to plates 115—116 projecting from opposite sides of the web. The girder as a whole may be formed in sections, marked 106—106a—106b—106c—106d. In this case the joints would be where the posts 112 are shown.

Fig. 13c shows an expansion joint between the meeting ends of two of the girders 106 forming a complete arch. 107a are right angle flanges as indicated in the right hand end of Fig. 13b. 117 is the plywood covering or skin laid upon the flanges 107, and 118 is an expansion coupler bolted at 119 to the flanges 107.

In considering the framing of the girder 106 and of the purlines 113—114 it should be observed that Fig. 15 is a section on the line 15—15 of Fig. 14 and shows the two plates 115 in section. Each plate has a flange 115a on its outer edge for stiffening purposes, these flanges being cut away below the purlines as shown in Fig. 14.

Referring now to Figs. 16, 17 and 18, these show a side view, a sectional and plan view respectively of the coupler and braces at the head and foot of each spar as described in connection with Figs. 7a to 7d and 8a to 8d, inclusive. The tubes are swaged down at their ends and flattened, with an eye 120 on the end of each, and a bolt 121 which may be tubular, extending through the eyes, 122—123 are horizontal diagonal braces and in Figs. 16 and 17, 58 are the vertical tubular posts of the spar, and 124 are other diagonal braces in the direction of the length of the spar in Figs. 16 and 17. 400 represents a modified form end fitting for the frame tube 40, whereby it is attached by bolts to the coupler plate 65 instead of being welded thereto. 35a are the spar tubes (see Figs. 7a and 7c and 10e).

Referring now to Figs. 23, 24 and 25, these show the construction of the window lights 16 in the leading edge of the central section 39 of the plane. Fig. 23 is a view of the lower left hand portion of the leading edge shown in Fig. 24 looking in the direction of the arrow 23 in said figure. Fig. 24 on the other hand is a section on the line 24—24 of Fig. 23. The mould of the leading edge having been determined, the flanged frame of the rib is comformed thereto as shown in Figs. 7a and 24, (which is an enlarged fragment of Fig. 7a). These outer flanged frames may be constructed of duralumin or equivalent material as the frame 40 of the rib is made of steel tubing. The glass or equivalent material employed is rolled into shapes having the same contour in section as the flanges. Each shape is triplexed, that is to say, constructed so as to be non-shatterable. One way of constructing such glass is to place together two sheets of glass with a sheet of elastic transparent material such as celluloid between them. The three laminæ are pressed together while warm. Glass of this type will yield somewhat under pressure, which is an advantage in setting up clamping flanges, as it avoids fracture. However, I preferably encase each edge of each glass form or pane in a resilient channel, whereby the glass is further protected against splintering from the metal parts. 125 indicates glass formed of panes of the type described fitted to the outer frame 126 of a rib, and to other outer frame members of the nature of purlines, (see 127 in Fig. 23). Glass forms are held in place by overlying clamping strips 128 secured to the frames in any suitable manner as by means of screws or bolts 129.

The construction of the glass, or equivalent material, and the method in detail of securing it in position may be varied without departing from the spirit of my invention, but the details are described herein in order to inform those skilled in the art of the best method at present known to me of practicing the invention. An essential detail is the method of effecting the joint between the plywood covering and the glass. In Fig. 25 are shown on an enlarged scale a joint 130 on the longitudinal line of framing to which the edges of both the plywood section and the glass section are connected. Fig. 25 is a section on the line 25—25 of Fig. 24 looking in the direction of the arrows, that is to say, toward the line of framing in question. The flange 126 terminates at a cross T flange 131, to which the longitudinal frame 132 is bolted. Rubber channel 133 rabbeted out to receive the glass, and abutting against the end of the plywood section 117 is fitted along the T head of the frame 132 and the glass as well as the edge of the plywood strip is held in place by the metal strip 134 secured to the frame by screws 135 or other means of joining. 128 in Fig. 25 shows the same vertical strips as appear in Fig. 23.

Figs. 26a, 26b, 26c and 26d represent a main rib with compression rib assembly as heretofore described in connection with Figs. 7a to 7d, 8a to 8d, and 9a and 9b. In Figs. 26a and 26b, however, I have shown modified arrangements of the spar tubes. The construction of the frame 40 and the general functions of the vertical tubes 43 and the diagonal braces are the same as before, but instead of having the coupler plate 73 carrying six tubes in the same horizontal plane, in the present case I arrange the six tubes at the head and foot of the forward spar in a hexagonal pattern and connect the tubular posts 61 thereto by means of a strain plate 136. Similarly, I arrange the four tubes at the head and foot of the rear spar in a square pattern and connect them to the vertical tubes 61 by strain plate 137. As shown in Figs. 26a to 26d, the spar construction is cleaner and simpler and except where special circumstances call for the arrangement of Figs. 7 and 8, I prefer to use the spar shown in Figs. 26a and 26b.

In Figs. 27a, 27b, and 27c, which taken together constitute a side elevation, and Figs. 28a, 28b and 28c, which taken together constitute an elevation at right angles thereto, I have shown a typical tubular post which may be employed in the spars or other parts of the ship. Fig. 29 shows an end view, and Fig. 30 shows one of the coupling plates detached. In this case the tubes are arranged in the hexagonal pattern previously referred to, as shown in Fig. 29 and their ends which are swaged down and flattened, are bolted to the plates 139 shown in Fig. 30, the bolt holes and the bolts for each tube being also arranged in the form of a hexagon. There is one of these plates for each pair of tubes, as shown in Fig. 29. The tubes are maintained in definite relative relation throughout their length by a form 138 shown in elevation in Fig. 31 and in section in Fig. 32, also shown in outline in dotted lines in Figs. 27a to 27c and 28a to 28c. The tubes are held in close contact with the form by limiting strips 62 and the terminal plates 139 at both ends of the column are provided with openings 140 to receive through bolts 141 by which they are secured in brackets 142.

Fig. 33 is a detail showing one tube detached from the column. It will be observed that in shape, relative dimensions and in its unbroken continuity, this tube is designed for maximum strength for any given weight, and moreover in common with all the other tubes will not change its form or alter its resistance under torsional strains which would produce distortion in other shapes.

While there are numerous details of construction and arrangement in my plane thus set forth, which can be varied without departing from the spirit of my invention, there are a number of points which should be emphasized as having a direct bearing on the practicability of any ship of the magnitude here contemplated. One of these points relates to means for permitting and compensating for expansion and contraction. A body of such great dimensions, built on a frame almost exclusively of metal, even though incased in such an insulating medium as plywood, must be affected by changes in temperature, humidity, and the like to a greater extent than the small planes heretofore employed. Regarding temperature alone, I have provided for expansion and for free movement of the parts in every possible way. Thus, in the arches of Figs. 12a to 12d inclusive, which extend across the salon from one outrigger 11 to the other outrigger 12, I have provided each arch with a joint at the key position thereof which will open and close through a sufficient distance during contraction and expansion of the metals in the girders, outriggers, and frame generally, to compensate for the overall change. It is unnecessary to specify any particular distance, as the computation of dimensions is a matter of engineering detail, and the principle involved will be clear to anyone skilled in the art from the illustration and description given.

Similarly in the connections between the spars and the ribs (see Figs. 7a to 7d and 8a to 8d and 26a to 26d), I have shown what amounts to universal joints, or freedom of movement in two intersecting planes, whereby a considerable amount of warping or distortion in the wing may be permitted and compensated for. In the floor girders and floor joists of Figs. 19 to 22 inclusive and in Figs. 12a to 12d and the related Figs. 10a to 10d, I have designed the parts so that they will effect natural and automatic compensation. As a matter of fact, I also propose to put on the skin or plywood covering of my aerofoil in overlapping layers, and in such fashion that the resultant steps or jogs in the surface will not only keep the skin clear of the usual film of dead air but will also permit fore and aft expansion and contraction of the skin itself and of the frame supporting it. Furthermore I have provided a method of applying this covering or skin to the frame somewhat after the fashion of shingles on a roof, or siding on a frame so that the skin itself will permit expansion and contraction in the direction of the length of the wing. These provisions and arrangements are described and claimed in my prior copending application, Serial No. 398,061, filed Oct. 7, 1929, and therefore need not be specifically described herein.

In considering possible changes of dimension due to expansion and contraction, I have taken into account the fact that studies on this subject have been prosecuted by railroad engineers for many years, and that most of the traction lines which formerly allowed for end-on expansion and contraction in their rails, now weld the latter solidly together. It is true that these rails are usually exposed to the air only at the head, nevertheless in the winter the soil and cement around them must go below the freezing point and the maximum variation in the temperatures to which they are exposed probably does not fall far short of 100° Fahrenheit. On the other hand, in this aeroplane we have a superficial area of something over 10,000 square feet exposed to radiant energy from the sun which is only partly neutralized by the air currents. In the large dirigible airships, such as the Zeppelins, which are the only vehicles within my knowledge having a sufficient area to justify comparison, it has been found that the effect of absorbed heat energy is very pronounced, and it has been necessary to make compensation therefor. I do not claim therefore that it involves invention broadly to make compensation for changes in temperature or to provide play enough in parts to permit expansion and contraction; but I do claim that the application of known principles to an aeroplane, and the design of the parts to render practical and even possible the successful operation of an aeroplane of the size herein set forth involves invention, particularly as to the forms and methods of application, and I shall claim the same accordingly.

Another point which is to be emphasized, is the design of the frame as shown in general in Fig. 6 and more in detail in Fig. 11 whereby not only are strains transmitted with uniformity and efficiency so as to be absorbed by the entire structure, but the load to be carried is also distributed with proper relation to the framing and to the center of lift thereof, as well as the angular relation of the projecting ends of the wings as shown in Fig. 1a which diagrammatically illustrates the dihedral angle.

It is to be understood that the remarks relating to the frame structure of the main aerofoil itself, apply as well to the tail group shown in Figs. 2, 3, and 4. Specific description is not necessary, since the application of the same principles to the tail group as to the main aerofoil is within the scope of any one skilled in the art.

I wish to call attention to the fact that the floor frame 37 in Fig. 11 extends half way out the wing, and it is to be understood that I shall spread beyond the outriggers into the wings as far as may be necessary for carrying additional passengers, freight, postal matter, and especially fuel tanks such as drums of gasoline or oil, which cannot be accommodated in the central section of the wing between the outriggers. In a separate application I shall set forth specifically and claim the arrangements I have specially designed for this purpose, together with modifications of the present designs which permit of largely increasing the size of the ship and therefore its carrying capacity. In the present case however it should be noted that I have disclosed in Figs. 1, 6 and 11 particularly the extension of the companionways 19, and the floor frames, into the projecting wings, for the deliberate purpose of increasing the carrying capacity of the plane. Theoretically, it would be possible with this plane to provide for passengers and freight all the way out to each tip of the wing; and the use of the present design for that purpose is contemplated by me should occasion arise.

What I claim is:

1. An aerofoil comprising a pair of oppositely lifting structures and an intermediate combined lifting and housing structure united in an integral homogeneous symmetrical unit, the portions of such structure adapted solely for lift consisting of cantilever trusses with straight braces and an intermediate portion of said structure being adapted for both lift and housing, consisting of a rectangular frame having as elements cantilever trusses containing passageways through each individual element affording headroom sufficient for the passage of persons, said truss structures including spar trusses extending from end to end and rib trusses spaced apart thereon and intersecting the spar trusses at intervals, with tubular posts at the intersections, common to said spars and said ribs and having pivotal connection with said spars and said ribs at each intersection thereof, adapted to permit free motion of the elements of spars and ribs and to compensate for strains and stresses throughout the wing structure and for distortion due thereto.

2. An aerofoil comprising a pair of oppositely lifting structures and an intermediate combined lifting and housing structure united in an integral homogeneous symmetrical unit, the portions of such structure adapted solely for lift consisting of cantilever trusses with straight braces and an intermediate portion of said structure being adapted for both lift and housing, consisting of a rectangular frame having as elements cantilever trusses containing passageways through each individual element affording headroom sufficient for the passage of persons, and having a supplemental frame supported on the lower frames of the main truss structure composed of parallel girders, ends supported on the main truss frame, purlines supported on said girders, and diagonal braces between the purlines to form a secondary cantilever truss structure, and flooring secured thereto and extending throughout the main carrying portion of the plane.

3. An aerofoil comprising an integral homogeneous symmetrical unitary structure having dimensions such as to provide headroom within itself for persons, said structure composed essentially of a full cantilever truss system, with relatively heavy parallel spar trusses and relatively heavy parallel outrigger trusses, integrally connected together and enclosing a rectangular central portion of the aerofoil with means supported on the integral rectangular truss structure to support the flooring within said enclosed rectangle, and means in the connections between the trusses forming the rectangle to permit relative motion in different planes, whereby the central rectangular floor will receive maximum support at all times, while yielding to motion of the trusses and distortion in the wing structure.

4. An aerofoil as described in claim 3, having spars extending from end to end thereof, ribs spaced apart at intervals along said spars, together with suitable frames and covering for the same, said spars and ribs each constituting a complete integral cantilever truss, all said trusses being composed in their posts and braces of tubing.

5. An aerofoil as described in claim 3, having spars extending from end to end and ribs spaced apart at intervals along said spars, together with suitable outside frames and skin covering therefor, said spars and ribs being composed as to their principal parts of sectional tubular frames, with connections therebetween adapted to permit motion in response to strains and stresses in any part of the structure.

6. An aerofoil as described in claim 3 having spars extending from end to end and ribs spaced apart at intervals along said spars together with suitable outside frames and skin covering therefor, said spars and ribs being composed as to their essential parts of sectional tubular frames, with connections therebetween adapted to permit motion of the spar elements or truss members each in its on plane, to compensate for changes in form due to strains and stresses in the several parts of the structure, however produced.

7. An aerofoil as described in claim 3, having the main structure divided into three portions, a central carrying portion and two lateral projecting portions, spars extending through all three portions, ribs spaced at intervals along said spars, girders connecting said ribs overhead, and other girders connecting said ribs underfoot and a flooring laid upon said underfoot girders, connections between said girders and said ribs and between the spars and the ribs being resilient and adapted to permit flexion and adjustment thereto of the frame and the flooring within the frame.

8. An aerofoil as described in claim 3, divided into three portions, spars extending throughout all three portions, from tip to tip, ribs spaced apart along said spars from tip to tip, said ribs in the central portion provided with arched openings, overhead girders in the form of arches extending between the upper members of said ribs in said central portion, and underfoot girders extending between the lower members of said ribs in said central portion, with a flooring carried by said underfoot girders and outer frames and skin covering carried by said upper girders.

9. An aerofoil comprising a continuous, homogeneous, unitary structure composed of cantilever trusses and the truss members composed of metallic tubes, said structure being divided into sections and the truss members of the adjoining sections being connected through groups of the said tubes forming posts pivotally secured so as to permit flexion of the body of the aerofoil and distribution of strain therethrough.

10. The aerofoil described in claim 9, having ribs spaced apart and spars extending through the ribs, said ribs consisting of inner truss frames formed of tubes, and outer framing supported thereon with skin covering carried thereby, the tubular members of said ribs having yielding connection with the other members of the ribs in said outer framing, whereby movement of the various parts will be permitted to compensate for distortion as between the inner and outer framing.

11. The aerofoil described in claim 9, having ribs spaced apart and spars extending through and connected to the ribs, each rib comprising a plurality of rigid truss frames, extending between and beyond the spars, and an outer frame and skin carried on said truss frames, the tubular members of said ribs having yielding connection with the other members of the ribs in said outer framing, whereby movement of the various parts will be permitted to compensate for distortion as between the inner and outer framing.

12. The aerofoil described in claim 9, having a plurality of ribs spaced apart, spars extending through the ribs, each rib comprising a plurality of rigid truss frames extending between and beyond the spars and the ribs and the spars being connected together by flexible elements common to them and permitting flexion and distribution of strains throughout the body of the aerofoil.

13. The aerofoil described in claim 9, having a plurality of ribs, spars extending through the ribs, said spars composed of lengths of tubing coupled together at the head and foot of each spar, and said ribs comprising rigid truss sections extending between and beyond the spars, said sections being connected with the coupling members at the head and foot of each spar by resilient means, so as to permit flexion and relative distortion between said spars and ribs and the distribution of strains throughout the body of the aerofoil.

14. The aerofoil described in claim 9, having ribs spaced apart, and spars extending through the ribs, each spar consisting of a plurality of tubes head and foot extending between the ribs, each spar having vertical tubular posts extending between the head and foot tubes at each rib, and each rib having rigid truss sections extending between and beyond said spars with common couplers for the spar tubes and the rib trusses at the head and foot of said vertical posts in the spars.

15. In an aerofoil, a plurality of ribs spaced apart and a spar extending through said ribs from tip to tip of the aerofoil, said spar comprising upper and lower truss members and vertical posts for the same, with plates extending along both sides of the spar formed into arches and secured to the spar in such manner as to perform the function of diagonal braces in the cantilever truss, the upper and lower truss members of the spar being formed in sections secured together at their ends, in a series of links or connections with a post between the upper and lower of the next section at the end of the link, and the side plates being formed in corresponding sections, each section L shaped in girder form, with its stem extending down beside a post, its heels and toes secured with the heel of the next section at the end of the link, and at the top of the next succeeding post.

16. In an aerofoil, a plurality of ribs spaced apart and a spar extending through said ribs from tip to tip of the aerofoil, said spar comprising upper and lower truss members and vertical posts for the same with plates extending along both sides of the spar formed into arches and secured to the spar in such manner as to perform the function of diagonal braces in the cantilever truss, the upper and lower truss members of the spar being formed of sections connected together at their ends to form a succession of links, and the side plates being formed in a corresponding succession of inverted L shaped sections, each with its stem bolted or otherwise connected to the upper and lower truss members and its toe connected to the upper member of the next succeeding section, to form a complete cantilever truss with arched openings through it.

17. In an aerofoil, a plurality of ribs spaced apart and a spar extending through said ribs from tip to tip of the aerofoil, said spar comprising upper and lower truss members and vertical posts for the same with plates extending along both sides of the spar formed into arches and secured to the spar in such manner as to perform the function of diagonal braces in the cantilever truss, the side plates being formed of a succession of inverted L shaped sections connected together and to the upper and lower truss elements to form a succession of arched links each having right angle members and a web member forming a stiffening brace for the cantilever truss structure.

18. An aerofoil comprising a plurality of spars each formed in itself from end to end as a cantilever truss, a plurality of ribs secured between and across said spars, means for securing said ribs and spars integrally but flexibly together at their intersections, diagonal bracings beween the upper elements of the spars and the upper elements of the ribs, and between the lower elements of the spars and the lower elements of the ribs, substantially following the upper and lower contours of the areofoil whereby the entire structure is braced against distortion, horizontally, vertically and in all lateral directions.

19. The combination described in claim 18, with means for tapering the spars and the structure carried thereby, by reducing the cross sectional area of each connected spar at the same rib.

20. The combination described in claim 18, with means for tapering the spars and the structure carried thereby, by reducing the cross sectional area of each spar at the same rib, each of said ribs at the points of reduction being provided with both vertical and transverse truss bracing compression members, to prevent buckling in any direction.

21. The combination described in claim 18, having a supplemental bracing in a horizontal plane forming a supplemental cantilever truss along the forward side of the front spar and to the rearward side of the rear spar.

22. The combination described in claim 18, in which each rib is individually constructed as a cantilever truss and secured to the spars by means permitting flexing of the elements with respect to each other to take up strains and permit changes in form of the aerofoil.

23. The combination described in claim 18, having spars against displacement in a horizontal plane, but all the parts free to flex vertically in normal movements and changes of form of the aerofoil.

24. The combination described in claim 18, with the additional element of girders and joists extended parallel to each other through and across the ribs and the spars, whereby the entire structure is stiffened.

25. An aerofoil comprising a plurality of ribs each rib constructed of rigid members forming a cantilever truss, and a plurality of spars intersecting the ribs, each spar constructed of rigid members forming a cantilever truss, integral and flexibly connected posts common to the ribs and the spars at their intersections, and an outer frame extending around said ribs and spars and a skin or covering secured upon said frame over the entire surface of the aerofoil, and adapted to yield to relative movements of the ribs and spars.

26. The combination described in claim 25 in which the outer frames are formed with flanges and webs, the webs secured to the truss members of the spars, and the covering or skin secured upon the flanges.

27. The combination described in claim 25, with the outer frame composed of flanged members with lightening holes in the neutral axes thereof only.

28. The combination described in claim 25, in which the outer frames are T shaped in cross section laid and secured together in panels with their upper surfaces flush to receive the edges of the covering, and clamping strips over said edges secured to the frames and adapted to move with them, whereby to distribute strains and distortion in the frame throughout the skin of the aerofoil and without concentration at any point.

29. The combination described in claim 25, in which the outer frames are rigid in part, and in the rigid parts are shaped to the section of the entering edge of the aerofoil, and covering material permanently shaped to fit the same, with clamping means to hold said covering material in position.

30. The combination described in claim 25, in which a part of the fixed covering sheets are transparent.

31. The combination described in claim 25, in which a part of the fixed covering sheets are of glass.

32. In an aerofoil structure of the type described, a post composed of a plurality of metal tubes set in a symmetrical cross sectional plan, compression straps secured around said tubes and a head and foot structure each pivotally secured to the ends of all the tubes.

33. The combination described in claim 32, with a bracket for the head and foot of each column or post and a pivot plate for each pair of tubes, bolted thereto, the pivot plates and the tubes secured thereto lying in parallel planes with a main pivot bolt transverse thereto.

34. The combination described in claim 32, in which each tube is swaged down and flattened at the ends to receive its pivot plates, and means for securing the same therein.

35. The combination described in claim 32, having a channeled form within and fitting the inner contours of the tubes, whereby they are maintained in their relative positions.

In testimony whereof I hereunto affix my signature.

WILLIAM WHITNEY CHRISTMAS.